United States Patent
Endo et al.

(10) Patent No.: US 7,376,509 B2
(45) Date of Patent: May 20, 2008

(54) TRAVEL TIME CALCULATING METHOD AND TRAFFIC INFORMATION DISPLAY METHOD FOR A NAVIGATION DEVICE

(75) Inventors: Yoshinori Endo, Mito (JP); Shinichi Amaya, Sagamihara (JP); Akio Sumizawa, Sagamihara (JP)

(73) Assignee: Xanavi Informatics Corporation, Zama-Shi (JP)

( * ) Notice: Subject to any disclaimer, the term of this patent is extended or adjusted under 35 U.S.C. 154(b) by 418 days.

(21) Appl. No.: 10/811,966

(22) Filed: Mar. 30, 2004

(65) Prior Publication Data

US 2004/0249568 A1 Dec. 9, 2004

(30) Foreign Application Priority Data

Apr. 11, 2003 (JP) ............................. 2003-107857

(51) Int. Cl.
*G01C 21/34* (2006.01)
(52) U.S. Cl. .................. 701/209; 701/117; 701/208; 701/210; 701/211; 701/24; 701/200; 701/201; 701/202; 701/203; 701/204; 701/213; 701/219; 701/217; 340/995.13; 340/995.12; 340/905; 340/902; 340/995.19
(58) Field of Classification Search ........ 701/117–122, 701/200–204, 206–213, 217, 219; 340/990, 340/991, 993, 995, 988
See application file for complete search history.

(56) References Cited

U.S. PATENT DOCUMENTS

| | | | | |
|---|---|---|---|---|
| 4,706,086 A | * | 11/1987 | Panizza ...................... 340/902 |
| 5,126,941 A | * | 6/1992 | Gurmu et al. ................ 701/24 |
| 5,214,793 A | * | 5/1993 | Conway et al. ............. 455/500 |
| 5,343,399 A | * | 8/1994 | Yokoyama et al. ......... 701/211 |
| 5,406,490 A | * | 4/1995 | Braegas ...................... 701/210 |
| 5,428,545 A | * | 6/1995 | Maegawa et al. ........... 701/210 |
| 5,699,056 A | * | 12/1997 | Yoshida ...................... 340/905 |
| 5,818,356 A | * | 10/1998 | Schuessler ............. 340/995.12 |
| 5,845,227 A | * | 12/1998 | Peterson ..................... 701/209 |
| 5,845,228 A | * | 12/1998 | Uekawa et al. ............. 701/209 |
| 5,862,244 A | * | 1/1999 | Kleiner et al. .............. 362/104 |

(Continued)

FOREIGN PATENT DOCUMENTS

JP 10-82644 3/1998

(Continued)

*Primary Examiner*—Thomas G. Black
*Assistant Examiner*—Wae Louie
(74) *Attorney, Agent, or Firm*—Antonelli, Terry, Stout & Kraus, LLP.

(57) ABSTRACT

The navigation device of the present invention has a storage device which stores map data including link data of respective links constituting roads on a map, and statistical data including travel time (moving speed) which is determined by statistical values of traffic information collected in the past, with respect to each of the links. Then, the navigation device uses for each departure time candidate, the map data and the statistical data of collection conditions corresponding to the statuses upon passing each of the route constituting links which constitute the route, so as to obtain the travel time for each of the route constituting links. Thereafter, the travel times of respective route constituting links thus obtained are summed up, and the travel time between the departure position and the destination is obtained.

14 Claims, 26 Drawing Sheets

U.S. PATENT DOCUMENTS

| | | | |
|---|---|---|---|
| 6,134,500 A * | 10/2000 | Tang et al. | 701/202 |
| 6,236,933 B1 * | 5/2001 | Lang | 701/117 |
| 6,256,577 B1 * | 7/2001 | Graunke | 701/117 |
| 6,298,303 B1 * | 10/2001 | Khavakh et al. | 701/209 |
| 6,314,360 B1 * | 11/2001 | Becker | 701/117 |
| 6,317,686 B1 * | 11/2001 | Ran | 701/210 |
| 6,351,709 B2 * | 2/2002 | King et al. | 701/210 |
| 6,480,783 B1 * | 11/2002 | Myr | 701/117 |
| 6,560,532 B2 * | 5/2003 | Cayford | 701/209 |
| 6,577,946 B2 * | 6/2003 | Myr | 701/117 |
| 6,590,507 B2 * | 7/2003 | Burns | 340/995.13 |
| 6,615,130 B2 * | 9/2003 | Myr | 701/117 |
| 6,668,227 B2 * | 12/2003 | Hamada et al. | 701/208 |
| RE38,724 E * | 4/2005 | Peterson | 701/209 |
| 6,922,629 B2 | 7/2005 | Yoshikawa et al. | |
| 2001/0029425 A1 * | 10/2001 | Myr | 701/200 |
| 2001/0037305 A1 * | 11/2001 | Mochizuki | 705/52 |
| 2002/0177947 A1 * | 11/2002 | Cayford | 701/209 |
| 2003/0014181 A1 * | 1/2003 | Myr | 701/117 |
| 2003/0065442 A1 * | 4/2003 | Touney | 701/210 |
| 2003/0069683 A1 * | 4/2003 | Lapidot et al. | 701/117 |
| 2004/0220728 A1 * | 11/2004 | Cayford | 701/209 |
| 2004/0243301 A1 * | 12/2004 | Kim | 701/201 |
| 2007/0055443 A1 * | 3/2007 | Sumizawa et al. | 701/209 |
| 2007/0198176 A1 * | 8/2007 | Endo et al. | 701/208 |

FOREIGN PATENT DOCUMENTS

WO    03/014671    2/2003

* cited by examiner

| DATE | SEARCH CONDITION A (DAY TYPE) |
|---|---|
| 2002 / 11 / 28 | WEEKDAYS (COMMON) |
| 2002 / 11 / 29 | WEEKDAYS (BEFORE HOLIDAYS) |
| 2002 / 11 / 30 | HOLIDAY (COMMON) |
| 2002 / 12 / 01 | HOLIDAY (COMMON) |
| 2002 / 12 / 02 | WEEKDAYS (AFTER HOLIDAYS) |
| 2002⌈ / 12 / 03 | WEEKDAYS (COMMON) |
| ⋮ | ⋮ |

331    332

TRAVEL TIME CALCULATING METHOD AND TRAFFIC INFORMATION DISPLAY METHOD FOR A NAVIGATION DEVICE

BACKGROUND OF THE INVENTION

The present invention relates to a navigation device, and more particularly, to a travel time calculating method and traffic information display technique. Japanese Patent Laid-open Publication No. H10-82644 (hereinafter, referred to as Patent Document 1) discloses a technique in which a display configuration of a predetermined road on a map displayed on a display is changed according to the degree of traffic jam, in a navigation device. For example, in the case where the predetermined road is included in a route searched by route search, a portion of the predetermined road included in the route is displayed according to that degree of traffic jam on the road, which is judged by traffic information collected during a predetermined period of time in the past.

SUMMARY OF THE INVENTION

In the technique described in the Patent Document 1, however, a use of traffic information collected in the past for calculating the travel time is not taken into consideration. Further, some users may want to know a travel time by departure time or the quickest route by departure time as to a particular route. Since the Patent Document 1 is based on the premise that the current time is a departure time, these user's requirements cannot be satisfied.

The present invention has been made considering the situation above, and an objective of the present invention is to perform a processing of a navigation device, by use of the traffic information collected in the past. Another objective of the present invention is to calculate a travel time accurately, by use of the traffic information collected in the past. Further objective of the present invention is to search for a quickest route or to calculate a travel time, as to a plurality of departure times. Moreover, there is another objective of the present invention to differentiate a display mode according to whether or not the display information is obtained by interpolating process, when the traffic information is displayed based on the information collected in the past. Further objective of the present invention is to perform switching between a display of information based on the information collected in the past and a display of information based on the present status traffic information obtained from outside.

In order to solve the problem above, in a travel time calculating method of the navigation device according to the present invention, map data including link data of respective links constituting roads on a map is stored in a storage device of the navigation device. In addition, statistical data including the travel time or moving speed, which are determined by statistical values of the traffic information collected in the past is stored for each of the links. Here, the statistical data is classified by collection condition of the traffic information, which is a source of the statistical data. Then, a processing in the navigation device as described above is performed by use of this statistical data.

Specifically, the travel time calculating method allows the navigation device to perform the following:

a departure position/destination setting step which sets a departure position and a destination, a departure time candidate setting step which sets a plurality of departure time candidates, and a travel time calculating step which uses the map data and statistical data of collecting conditions corresponding to statuses in passing respective route constituting links, each constituting a route between the departure position and the destination, and obtains a travel time of each of the route constituting links, with respect to each of the departure time candidates.

The present invention may further allow the navigation device to perform a route specifying step, which specifies a route between the departure position and the destination. Then, the travel time calculating step may obtain a travel time of the route specified by the route specifying step.

It is further possible to allow the navigation device to perform a route searching step which searches a route between the departure position and the destination. Then, the travel time calculating step may obtain a travel time of the route which has been searched in the route searching step.

A traffic information displaying method of the navigation device regarding the present invention may further allow a storage device of the navigation device to store map data including link data of respective links constituting roads on a map, statistical data including a travel time or moving speed which are determined by statistical values of traffic information collected in the past as to each of the links, and determining information for determining whether the travel time or the moving speed of each of the links are generated from actual measurement data, or generated by an interpolating process using the actual measurement data. When the travel time or the moving speed of each link is displayed based on the statistical data, the navigation device is provided with display modes which are different between the case where the travel time or the moving speed of each link is generated from the actual measurement data, and the case where the travel time or the moving speed of each link is generated by the interpolating process.

Further, the traffic information displaying method of the navigation device having a current position detecting function, relating to the present invention, allows the storage device of the navigation device to store map data including link data of respective links constituting roads on a map, and statistical data including the travel time and moving speed which are determined by statistical values of traffic information collected in the past as to each of the links. Then, the traffic information displaying method allows the navigation device to perform an obtaining step which obtains present status traffic information as to each of the links existing in the surrounding area of the current position that is detected by the current position detecting function, a receiving step which receives a selection either a display mode for displaying the information based on the statistical data or a display mode for displaying the information based on the present status traffic information, and a displaying step which performs displaying with the display mode thus received.

DETAILED DESCRIPTION OF THE PREFERRED EMBODIMENTS

One embodiment according to the present invention will be described hereinafter with reference to the accompanying drawings.

Figure 1:
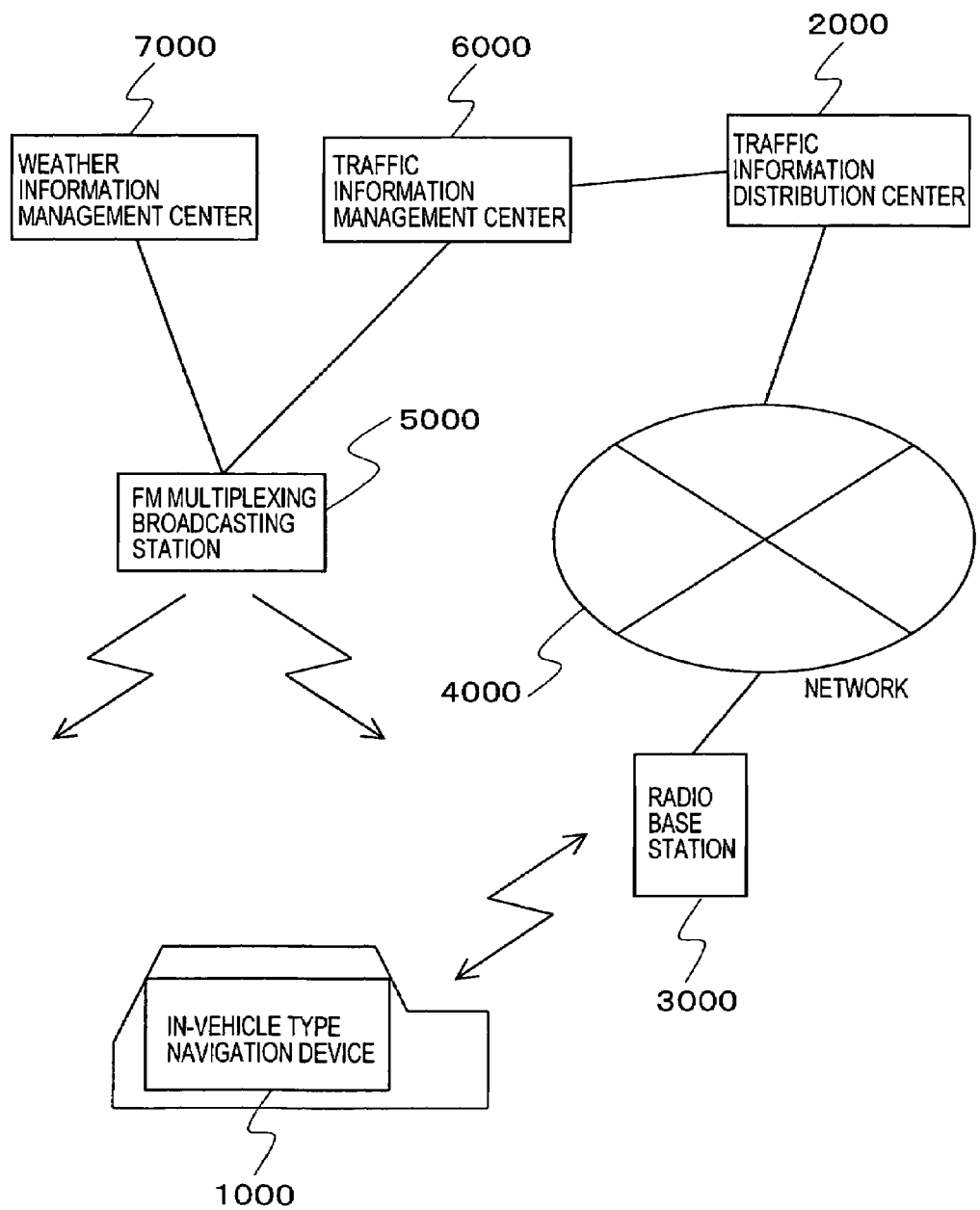
FIG. 1 is a diagram showing a schematic configuration of a navigation device to which one embodiment according to the present invention is applied.

FIG. 1 is a schematic view showing a navigation system to which one embodiment according to the present invention is applied. As illustrated, the navigation system according to the present embodiment comprises an in-vehicle type navigation device 1000 mounted on a vehicle, a traffic information distribution center 2000 connected to the in-vehicle type navigation device 1000 through a radio base station 3000 and a network 4000, a FM multiplexing broadcasting station 5000, a traffic information management center 6000, and a weather information management center 7000.

The traffic information management center 6000 manages latest traffic information in respective regions and distributes the traffic information to the traffic information distribution center 2000 and the FM multiplexing broadcasting station 5000.

The weather information management center 7000 manages weather information in respective regions and distributes the weather information to the FM multiplexing broadcasting station 5000.

The FM multiplexing broadcasting station 5000 broadcasts, as FM multiplexing broadcasting signals, outline present status traffic data of respective mesh areas which is created on the basis of traffic information in respective regions distributed by the traffic information management center 6000, the mesh areas been obtained by dividing a map into a plurality of portions. The outline present status traffic data includes the degree of link jam determined by current (latest) traffic information every link constituting roads located in a corresponding mesh area. Also, the FM multiplexing broadcasting station 5000 broadcasts as FM multiplexing broadcasting signals, traffic restriction information which is information of a link under traffic restriction. Further, the FM multiplexing broadcasting station 5000 broadcasts weather information of respective regions distributed from the weather information management center 7000 as FM multiplexing broadcasting signals. The weather information from the weather information management center 7000 can be distributed not from the FM multiplexing broadcasting station 5000 but from the traffic information distribution center 2000 described later.

The traffic information distribution center 2000 manages present status traffic data every mesh region obtained by dividing a map into a plurality of portions. The present status traffic data includes link travel time (or a link moving speed) and a degree of link jam, which are determined by the current (latest) traffic information, every link constituting roads located in a corresponding mesh area.

The in-vehicle type navigation device 1000 holds statistical traffic data every mesh area. The statistical traffic data includes link travel time (or a link moving speed) and a degree of link jam which are determined by statistical values of traffic information collected in the past, every link constituting roads existent in a corresponding mesh area.

With the above configuration, the in-vehicle type navigation device 1000 accesses to the traffic information distribution center 2000 through the radio base station 3000 and the network 4000 in accordance with outline present status traffic data in a mesh area corresponding to the periphery of a current position (vehicle position) which are received from the FM multiplexing broadcasting station 5000, and obtains present status traffic data in a mesh area corresponding to the periphery of the current position, if necessary. Further, using the present status traffic data obtained from the traffic information distribution center 2000 and the statistical traffic data beforehand held by the in-vehicle type navigation device 1000, the in-vehicle type navigation device 1000 searches a recommended route from the current position to the destination. At this time, the in-vehicle type navigation device 1000 refers to the weather information in the periphery of the current position which is received from the FM multiplexing broadcasting station 5000, in order to decide statistical traffic data being used.

Subsequently, the in-vehicle type navigation device 1000 will be described in detail.

The traffic information distribution center 2000 should just be equipped with a function for managing the present status traffic data every mesh area and a function for reading out the present status traffic data every mesh area requested by the in-vehicle type navigation device 1000 to transmit the data to the in-vehicle type navigation device 1000. Since the traffic information distribution center 2000 can be constructed on a computer system with the use of an existent technique, its detailed explanation is omitted in the present embodiment. Also, since an existent system is made use of to be able to construct the traffic information management center 6000, the weather information management center 7000, and the FM multiplexing broadcasting station 5000, their detailed explanation is omitted.

Figure 2:
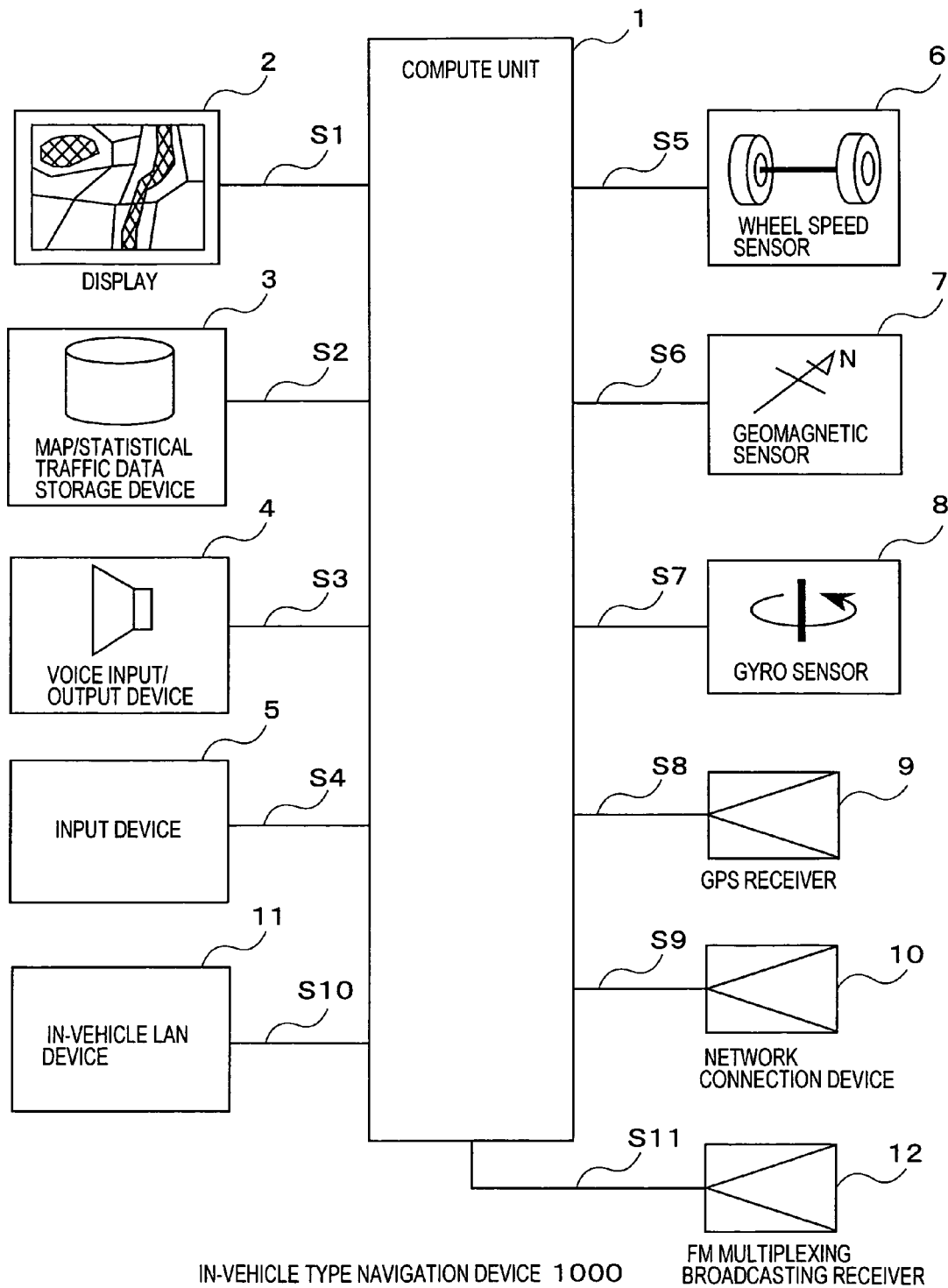
FIG. 2 is a schematic view showing a configuration of an in-vehicle type navigation device 1000.

FIG. 2 is a schematic view showing a configuration of an in-vehicle type navigation device 1000.

As shown in FIG. 2, the in-vehicle type navigation device 1000 according to the present embodiment comprises a compute unit 1, a display 2, a map/statistical traffic data storage device 3, a voice input/output device 4, an input device 5, a wheel speed sensor 6, a geomagnetic sensor 7, a gyro sensor 8, a GPS (Global Positioning System) receiver 9, a network connection device 10, an in-vehicle LAN device 11, and FM multiplexing broadcasting receiver 12.

The compute unit 1 is a central unit which performs various processing. For example, it detects a current position on the basis of information outputted from various sensors 6 to 8 and the GPS receiver 9, and reads out map data required for display from the map/statistical traffic data storage device 3 on the basis of the current position information thus obtained. Further, it develops the map data thus read out into graphics, overlaps the developed graphics with a current position mark and displays the result on the display 2. And it searches an optimum route (recommended route) connecting a destination and a departure position (a current position) indicated by a user by using map data and statistical traffic data stored in the map/statistical traffic data storage device 3 and the present status traffic data obtained from the traffic information distribution center 2000, and guides the user by using the voice input/output device 4 and the display 2.

The display 2 is a unit which displays the graphics information generated by the compute unit 1, and it comprises a CRT or liquid crystal display. Further, it is common practice for RGB signals or NTSC (National Television Standards Committee) signals to be used as singles S1 between the compute unit 1 and the display 2.

The map/statistical traffic data storage device 3 comprises a storage medium such as a CD-ROM, a DVD-ROM, a HDD or an IC card. In the storage medium, map data and statistical traffic data are stored.

Figure 3:
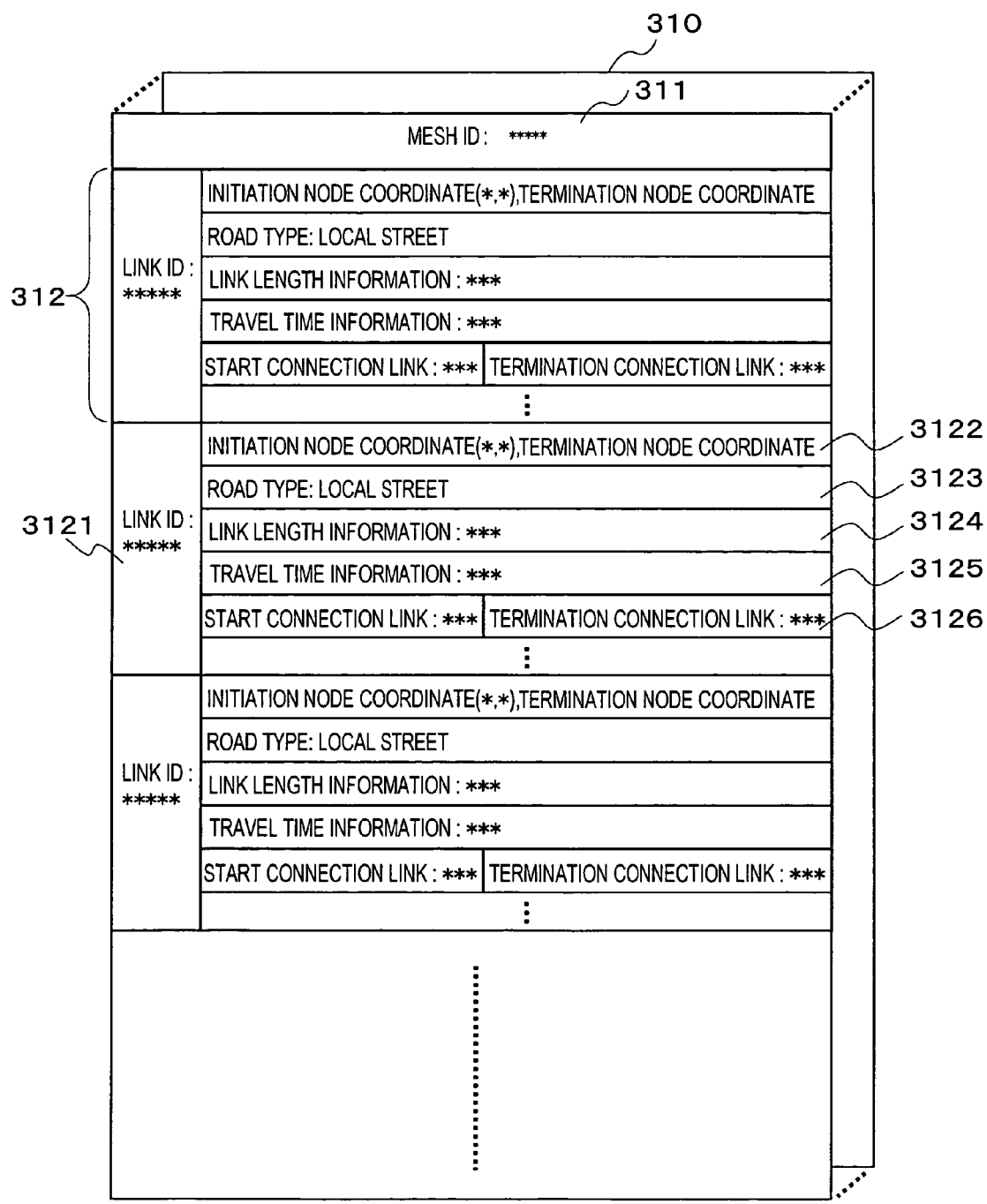
FIG. 3 is a view showing an example of a configuration of map data stored in a map/statistical traffic data storage device 3.

FIG. 3 is a view showing an example of a configuration of map data stored in the map/statistical traffic data storage device 3. As shown in FIG. 3, map data 310 is stored every mesh area. The map data 310 comprises an identification code (mesh ID) 311 of a mesh area, and link data 312 of respective links constituting roads included in the mesh areas. The link data 312 comprises a link identification code (link ID) 3121, coordinate information 3122 of two nodes (initiation node, termination node) constituting the link, road type information 3123 of a road including the links, link length information 3124 indicating ling length of the link, link travel time (or moving speed) information 3125 of the link, and link IDs (connection ID) 3126 of links respectively connecting to the two nodes, etc. In addition, by distinguishing between the initiation node and the termination node for the two nodes constituting the link, up and down directions of the same road, respectively, are managed as separate links. Further, the map data 310 comprises information (designation, type, coordinate information, etc.) of map constituents outside the roads included in corresponding mesh areas.

Figure 4:
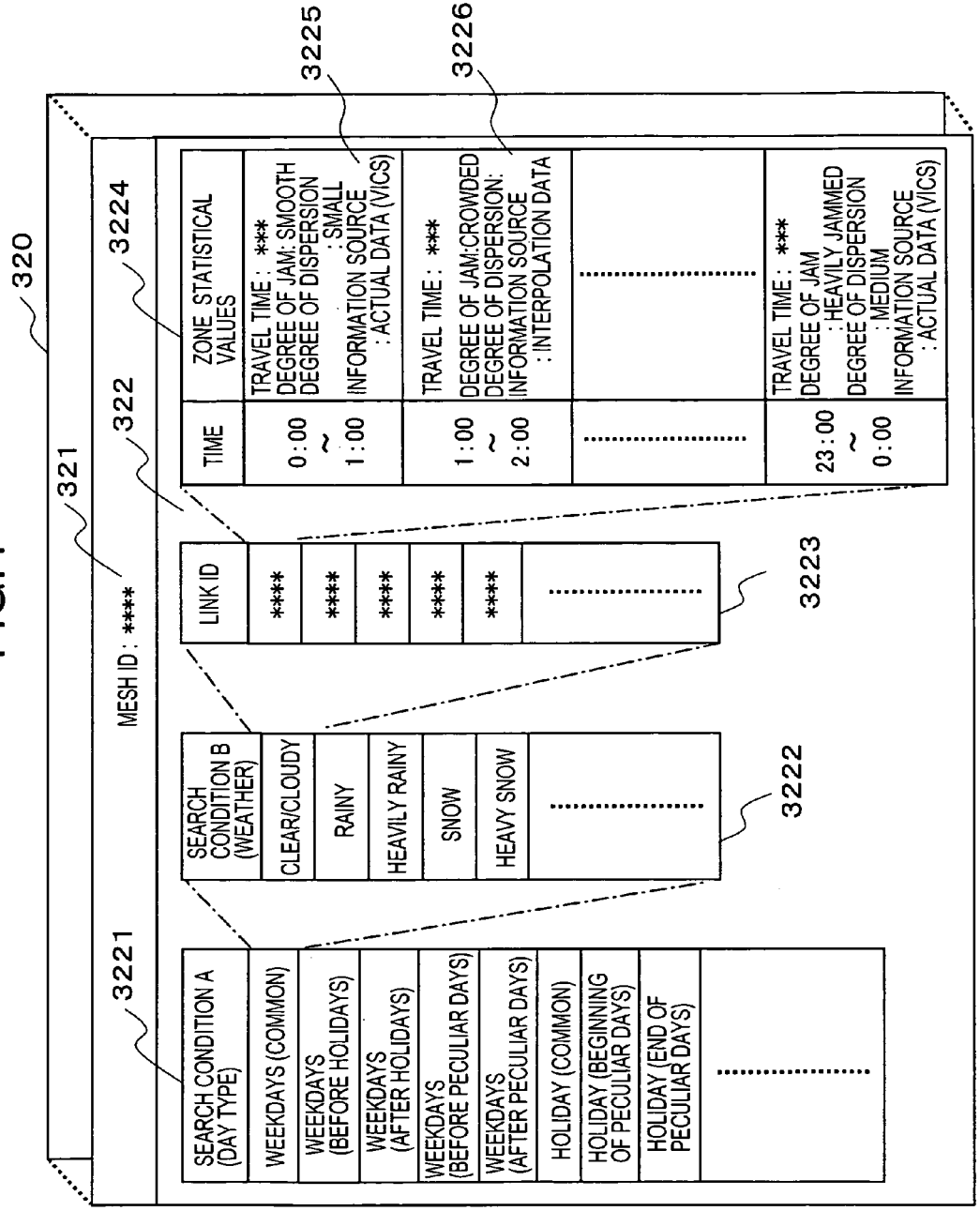
FIG. 4 is a view showing an example of a configuration of statistical traffic data stored in the map/statistical traffic data storage device 3.

FIG. 4 is a view showing an example of a configuration of statistical traffic data stored in the map/statistical traffic data storage device 3. As shown in FIG. 4, statistical traffic data 320 is stored every mesh area described above. The statistical traffic data 320 comprises mesh ID 321 of mesh area, and management data 322 for managing traffic information statistical values (statistical values of traffic information collected in the past) of respective links constituting the roads included in the mesh areas. The mesh ID 321 which is the same as mesh ID 311 of the map data 310 is used. The management data 322 comprises a plurality of tables 3221 to 3224 having the hierarchy structure.

The table 3221 is one which registers the day type. The day type is preferably decided every unit at which traffic information statistical values have a tendency to differ. Here, weekdays before holidays "weekdays (before holidays)", weekdays after holidays "weekdays (after holidays)", weekdays before peculiar days such as Christmas or the like "weekdays (before peculiar days)", weekdays after peculiar days "weekdays after peculiar days (after peculiar days)", other weekdays "weekdays (common)", a first day of peculiar days "holiday (beginning of peculiar days)", a last day of peculiar days "holiday (end of peculiar days)", and other holidays "holidays (common)" are used as the type of days.

The table 3222 is one which registers a weather type, and is provided every day type registered in the table 3221. The weather type is preferably decided every unit at which traffic information statistical values have a tendency to differ. Here, "clear/cloudy", "rainy", "heavily rainy", "snow", and "heavy snow" are used as the types of weather.

The table 3223 is one which registers a link ID of each link constituting roads included in mesh areas identified by the mesh ID 321, and is provided every weather type registered in the table 3223. The link ID which is the same as link ID 3121 of the map data 310 is used.

The table 3224 is one which registers traffic information statistical values every time zone, and is provided every link ID registered in the table 3223. The traffic information statistical values every time zone include link travel time (or moving speed), degree of dispersion (dispersion) in link travel time (or moving speed), and degree of link jam, which are specified by plural traffic information being an origin of the values. Further, the traffic information statistical values every time zone are classified according to the collection condition of the traffic information being an origin (a day type and a weather type in which traffic information being an origin is collected) and a link under consideration. That is, the link under consideration for the traffic information statistical values every time zone which are registered in the table 3224 is one specified by a link ID in the table 3223 corresponding to the table 3224, and traffic information being an origin of the statistical values is one collected in a weather specified by the weather type in the table 3222 corresponding to the table 3223 in which the link ID is registered, and a day specified by the day type in the table 3221 corresponding to the table 3222 in which the weather type is registered.

In addition, as described above, the traffic information statistical values include degree of link jam (in FIG. 4, three levels, heavily jammed, crowded, and smooth). Generally, in order to calculate the degree of jam, it is necessary to compare speed limits of respective links with moving speeds (calculated from link length and travel time) obtained from the traffic information statistical values. By beforehand having the degree of jam in the traffic information statistical values, degrees of jam for respective links can be determined without the use of speed limit information of the respective links, so that it is not necessary for link data to include the speed limit information. Thereby, the link data can be reduced in data size.

Figure 15:
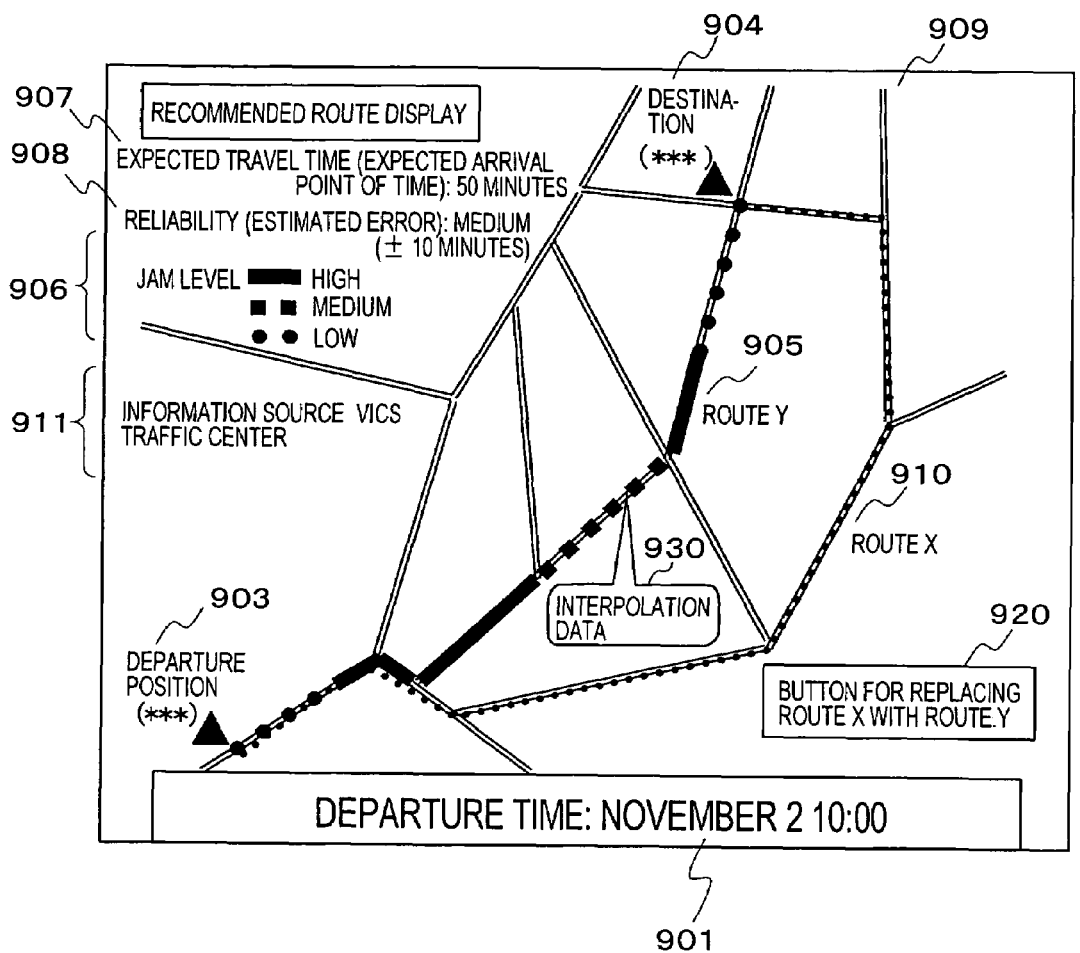
FIG. 15 is a view showing an example of a map display of a recommended route.

The traffic information statistical values further includes information (information source) which indicates whether the traffic information such as the travel time is data based on actual measurement (actual data) 3225 or data obtained by estimated interpolation (interpolation data) 3226. It is to be noted that all the links on the map do not necessarily have actual data representing the travel time, degree of jam and the like. In such a case, the travel time and the like are obtained by a particular interpolating process utilizing actual data and the like of another link. The interpolation data is used in the route searching, expected travel time calculation and the like similar to the actual data. However, as shown in FIG. 15, the in-vehicle type navigation device 1000 of the present embodiment displays jam levels and so on being obtained from the degree of jam. In this display, there is a case where it is preferable to display such that the items obtained from the actual data are distinguished from the items obtained from the interpolation data. If the display is given in distinguished manner as such, a user can determine by oneself the accuracy of the information. Alternatively, it may be preferable for some users that the items obtained by the interpolation data are not displayed. Under these circumstances, the present embodiment includes in the table 3224 an information item indicating whether the information such as travel time is obtained from the actual data or the interpolation data, and this information item is utilized upon displaying the traffic information.

If the information is actual data, information source as to where the information comes from is included. This information source is included in the traffic information statistical values in advance, and it is utilized for display, whereby it is possible for the user to judge the accuracy of the traffic information statistical values.

Further, the traffic information statistical values include the degree of dispersion (dispersion) in link travel time which is specified by the plural traffic information being an origin of the values. By beforehand having the degree of dispersion in the traffic information statistical values to be used for displaying, the reliability of link travel time which is specified by the traffic information statistical values can be judged by a user.

In addition, the map/statistical traffic data storage device 3 stores a conversion table (referred to as a first conversion table) which specifies a mesh ID of a mesh area including a point specified by the coordinate information, in addition to the map data and the statistical traffic data. Further, the map/statistical traffic data storage device stores a conversion table (referred to as a second conversion table) which specifies a day type managed by the table 3221 on the basis of the date.

Figure 5:
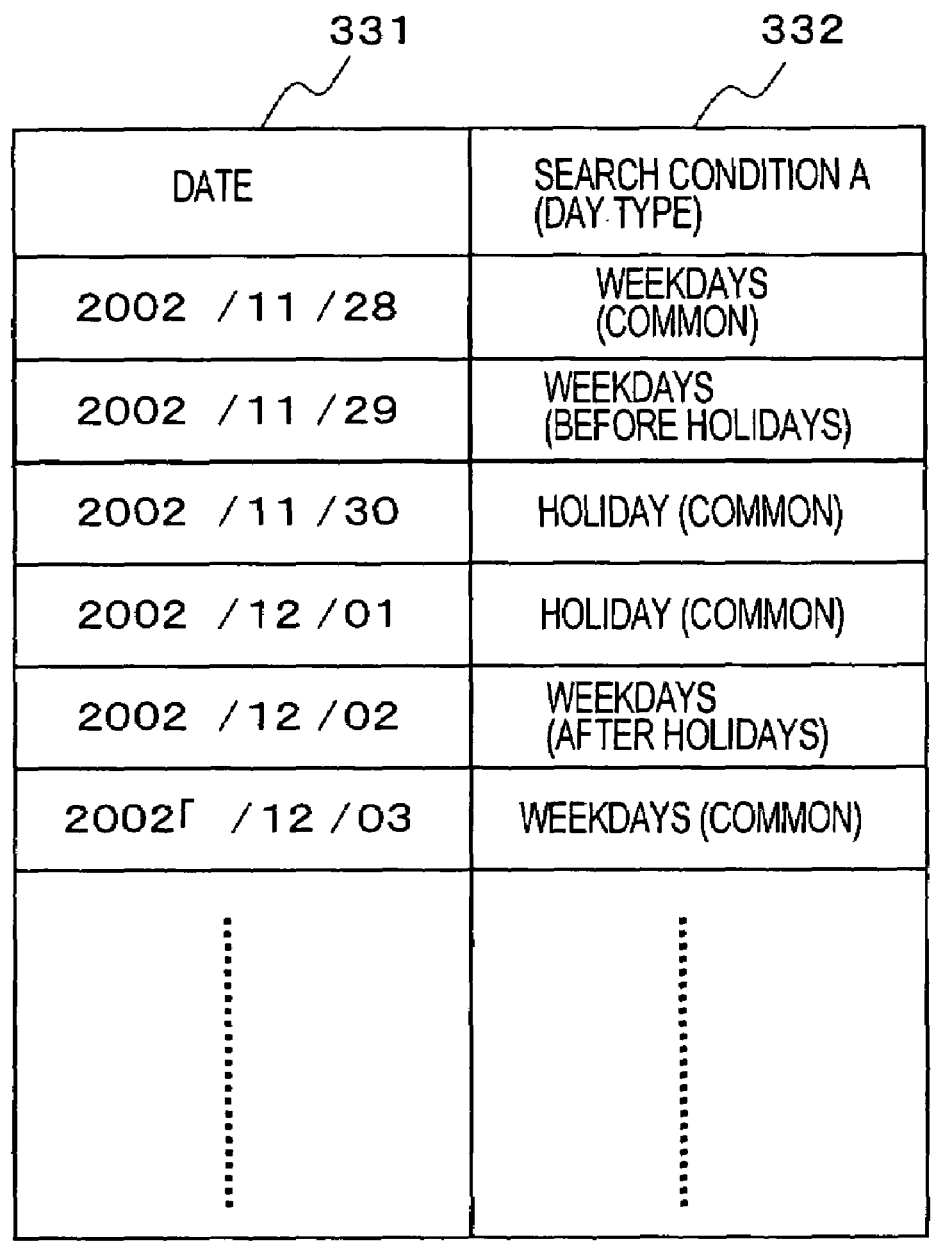
FIG. 5 is a view showing an example of a configuration of a second conversion table which specifies a day type on the basis of date.

FIG. 5 is a view showing an example of a configuration of the second conversion table. As shown in FIG. 5, a date 331 and a day type are matched to be registered in the second conversion table. The second conversion table is used to enable simply specifying a day type on the basis of the date. For example, in a case where software installed into the in-vehicle type navigation device executes the processing of specifying a day type on the basis of the date through the calculation logic, the software must be rewritten in order to further subdivide the classification of day type. Also, the specific processing for peculiar days such as the year-end and Christmas becomes complicated. In this respect, since the present embodiment adopts the conversion table as shown in FIG. 5, only exchange of a CD-ROM and a DVD-ROM which constitute map/statistical traffic data storage device 3 can meet with subdivision of the classification without modification of the software installed into the in-vehicle type navigation device. Further, no complicated processing needs for specifying a day type, since peculiar days can be specified from the conversion table.

Concretely, the traffic information distribution center 2000 manages present status traffic data in a corresponding mesh area, in such a manner as associated with its mesh ID. The mesh ID is the same as the mesh ID 311 of the map data 310 and the mesh ID 321 of the statistical traffic data 320. Also, in the present status traffic data, link travel time (or a link moving speed) and a degree of link jam are registered in such a manner as associated with a link ID. The link ID is the same as the link ID used in the map data 310 and the statistical traffic data 320. Also, the degree of link jam is set according to the same standards as those for the degree of link jam used in the statistical traffic data 320.

An explanation is given returning to FIG. 2. The voice input/output device 4 converts to a voice signal a message which is generated for a user by the compute unit 1, and recognizes a user's voice and transmits the content to the compute unit 1.

The input device 5 receives an instruction from the user, and a scroll key, a hard switch such as a scroll key and a scale alternation key, a joy stick, a touch panel on a display or the like are used as the input device 5.

The sensors 6 to 8 and the GPS receiver 9 are used to detect a current position (vehicle position) by the in-vehicle type navigation device. The wheel speed sensor 6 calculates a travel distance from the produce of the peripheral of a wheel and the number of rotations of the wheel, and calculates an angle, at which a vehicle turns, from a difference of the number of rotations between a pair of wheels. The geomagnetic sensor 7 detects the magnetic field inherent to the earth to detect a direction in which a vehicle faces. The gyro 8 detects an angle at which the vehicle turns. As an optical fiber gyro, a vibration gyro or the like are used as the gyro 8. The GPS receiver 9 receives a signal from three or more GPS satellites and measures distances between the vehicle and each of the GPS satellites and change rates of the distances, to measure a current position, a travel direction and a travel azimuth of the vehicle.

The network connection device 10 controls a radio communication device, such as portable telephone or the like, connected to the in-vehicle type navigation device 1000 and accesses to the traffic information distribution center 2000 through the radio base station 3000 and a network such as public network, the Internet and the like. Further, the network connection device 10 communicates with the traffic information distribution center 2000.

The in-vehicle LAN device 11 receives various information on a vehicle on which the in-vehicle type navigation device according to the embodiment is mounted, such as door opened/closed information, a status of a turn-on lamp, a status of an engine, a trouble diagnosis result, etc.

The FM multiplexing broadcasting receiver 12 receives outline present status traffic data, traffic restriction information, and weather information sent as FM multiplexing broadcasting signals from the FM multiplexing broadcasting station 5000.

Here, the outline present status traffic data includes mesh IDs (the same as mesh IDs used in the map data 310, the statistical traffic data 320 and the present status traffic data) every mesh area included in an object region (for example, unit of the metropolis and districts), and link IDs and the degree of link jam (set according to the same standards as those for the degree of link jam used in the statistical traffic data 320 and the present status traffic data) of respective links included in the mesh regions.

Also, traffic restriction information includes link IDs of links being restricted, and mesh IDs of meshes including the links being restricted.

Also, the weather information includes mesh IDs (the same as mesh IDs used in the map data 310, the statistical traffic data 320 and the present status traffic data) of mesh areas included in an object region (for example, unit of the metropolis and districts), a weather type (weather type registered in the table 3222 of the statistical traffic data 320) of weather in the object region, and time zones (referred to as object time zones) in which the weather continues.

As for the weather information, the state of the operation of a wiper on a vehicle on which the in-vehicle type navigation device 1000 is mounted, and a detection value of an outside air temperature sensor mounted on the vehicle may be received through the in-vehicle LAN device 11, and weather may be judged on the basis of the result as received.

Figure 6:
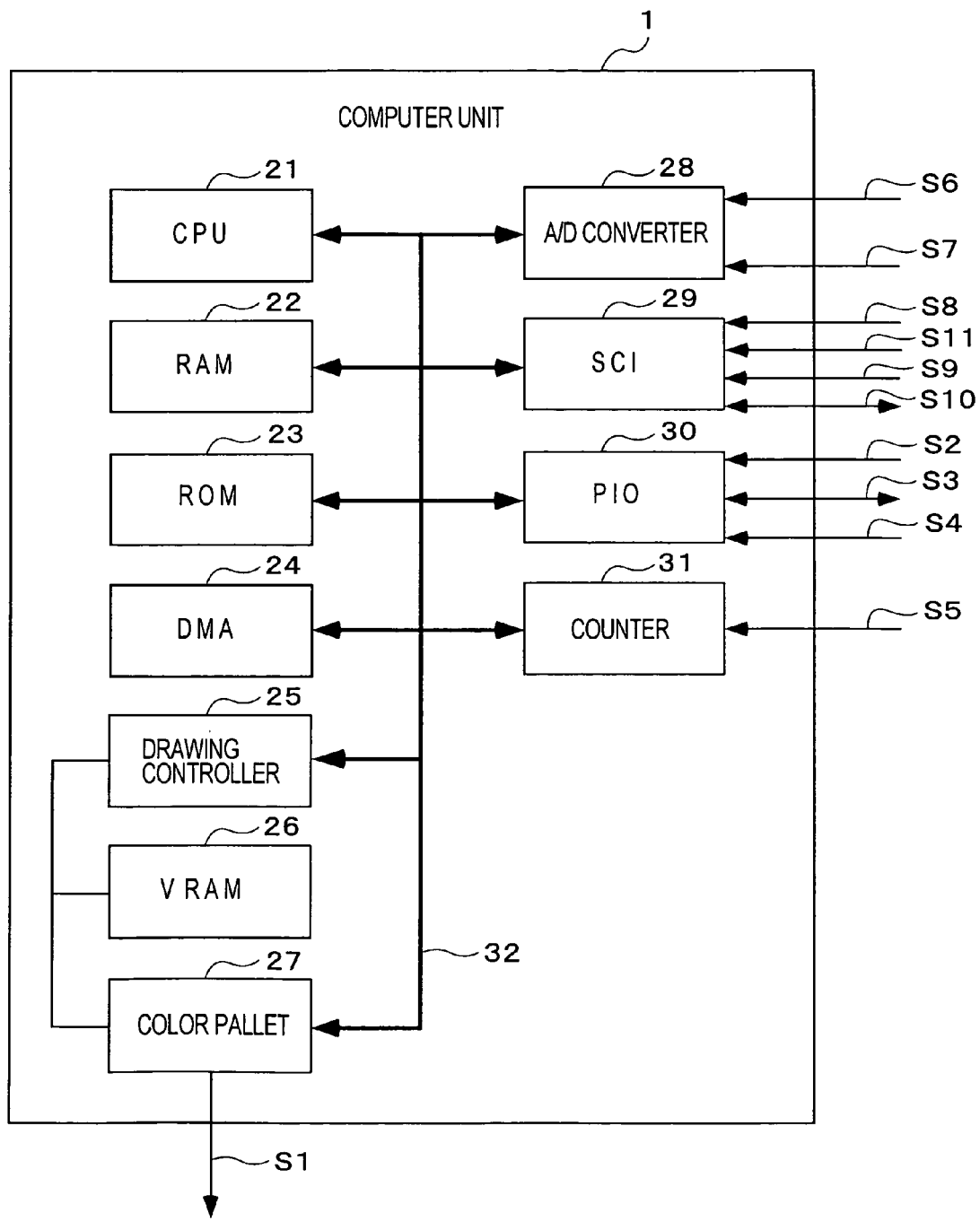
FIG. 6 is a diagram showing the hardware configuration of a compute unit 1.

FIG. 6 is a diagram showing the hardware configuration of the compute unit 1.

As shown in FIG. 6, the compute unit 1 has such a structure that various devices are connected to one another through a bus 32. The compute unit 1 comprises a CPU (Central Processing Unit) 21 which performs various processing such as controlling the numerical calculation and each device, a RAM (Random Access Memory) 22 which stores map data and statistical traffic data which are read out from the map/statistical traffic data storage device 3, and present status traffic data and calculation data obtained from the traffic information distribution center 2000, a ROM (Read Only Memory) 23 which stores programs and data, a DMA (Direct Memory Access) 24 which performs data transmission between memories and between each memory and each device, a drawing controller 25 which performs graphics drawing and also performing display control, a VRAM (Video Random Access Memory) 26 which stores graphics image data, a color pallet 27 which converts image data to RGB signals, an A/D converter 28 which converts analog signals to digital signals, a SCI (Serial Communication Interface) 29 which converts serial signals to parallel signals which are synchronized with the bus, a PIO (Parallel Input/Output) 30 which inputs the parallel signals on the bus in synchronism with the bus, and a counter 31 which integrates pulse signals.

Figure 7:
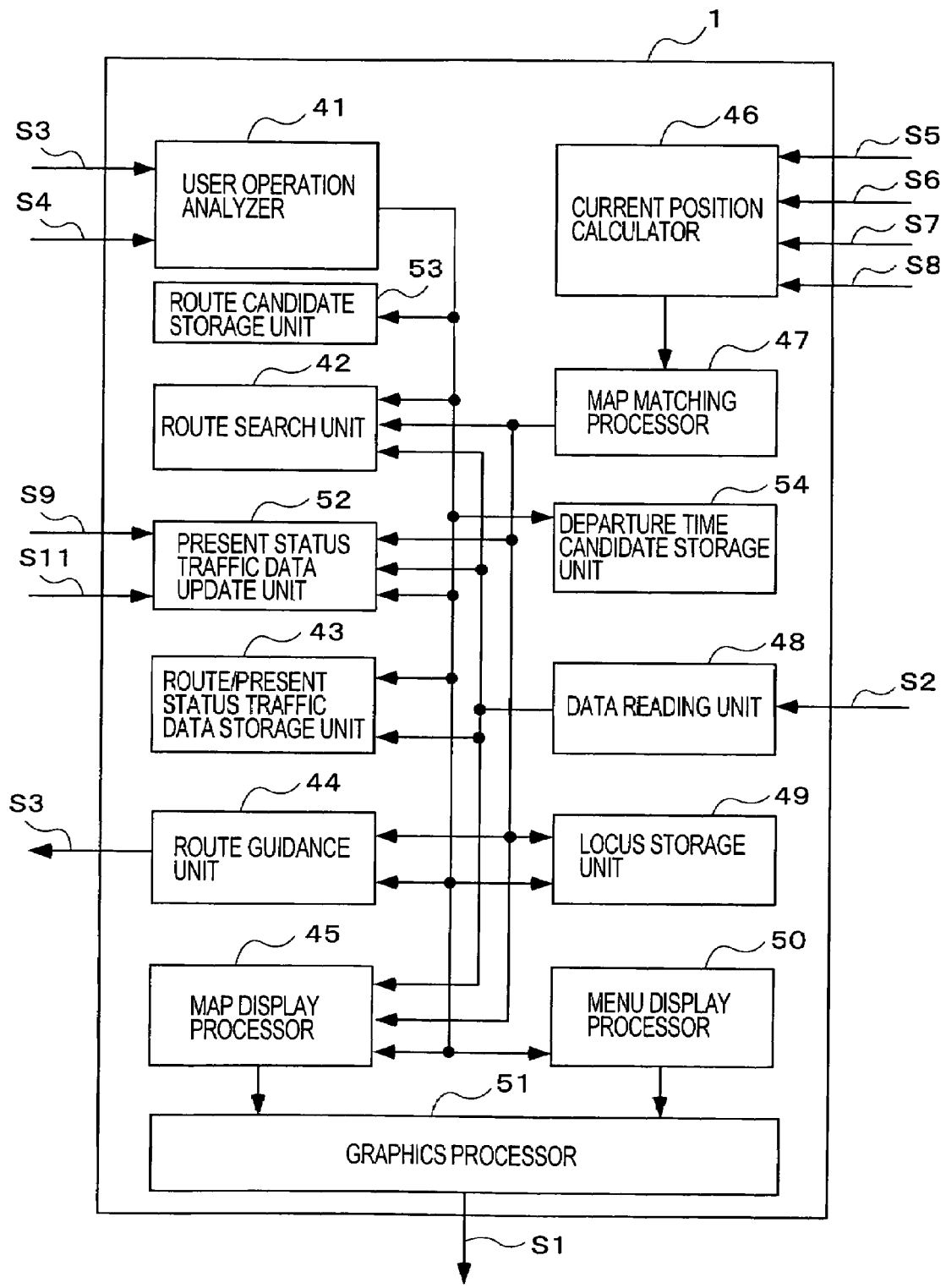
FIG. 7 is a diagram showing the functional configuration of the compute unit 1.

FIG. 7 is a diagram showing the functional configuration of the compute unit 1.

As shown in FIG. 7, the compute unit 1 comprises a user operation analyzer 41, a route search unit 42, a route/present status traffic data storage unit 43, a route guidance unit 44, a map display processor 45, a current position calculator 46, a map matching processor 47, a data reading unit 48, a locus storage unit 49, a menu display processor 50, a graphics processor 51, and a present status traffic data update unit 52.

By using distance data and angle data which are obtained by integrating distance pulse data S5 measured by the wheel speed sensor 6 and angular acceleration data S7 measured by the gyro 8, respectively, the current position calculator 46 performs processing of integrating the distance data and the angle data on the time axis to periodically calculate the current position (X', Y') after the vehicle runs from an initial position (X, Y) and outputs the current position to the map matching processor 47. Here, in order to achieve coincidence between an angle at which the vehicle turns and a travel azimuth of the vehicle, an absolute azimuth in the travel direction of the vehicle is estimated by referring to azimuth data S6 obtained from the geomagnetic sensor 7 and angle data obtained by integrating the angular acceleration data S7 obtained from the gyro 8. Since errors are gradually accumulated as the data of the wheel speed sensor 6 and the data of the gyro 8 are respectively integrated, the processing of canceling the accumulated errors on the basis of position data S8 obtained from the GPS receiver 9 is performed periodically, and the current position information is outputted to the map matching processor 47.

The map matching processor 47 performs map matching processing for collating a travel locus stored in the locus storage unit 49 described later with map data surrounding the current position which are read by the data reading unit 48 to set the current position outputted from the current position calculator 46 onto a road (link) having the highest correlation in shape. Since the current position information obtained by the current position calculator 46 includes sensor errors, map matching processing is performed for the purpose of enhancing the positional accuracy. Accordingly, the current position is set to be coincident with the road on which the vehicle is running in many cases.

The locus storage unit 49 stores as locus data the current position information which has been subjected to the map matching processing in the map matching processor 47 every time the vehicle runs for a predetermined distance. The locus data is used to draw a locus mark on a road which is located on the corresponding map and on which the vehicle has run.

The user operation analyzer 41 receives a user's request inputted into input device 5 to analyze the content of the request. It controls various constituent parts of the compute unit 1 so that a processing corresponding to the content of the request is performed. For example, when the user requests to search a recommended route, the user operation analyzer 41 requests the map display processor 45 to perform a processing of displaying a map on the display 2 for the purpose of setting a destination, and further requests the route search unit 42 to perform a processing of calculating a route from the departure position to the destination.

The present status traffic data update unit 52 obtains present status traffic data from the traffic information distribution center 2000 through the network connection device 10 and updates the present status traffic data stored in the route/present status traffic data storage unit 43.

The route search unit 42 searches a route (route of the minimum cost (travel time)), through which the vehicle can reach a destination in the shortest time, out of routes connecting two specified points (the current position and the destination) by using the Dijkstra method or the like from map data, and stores the searched route as a recommended route in the route/present status traffic data storage unit 43. In the present embodiment, in order to calculate the cost for a route connecting two points, there are used statistical traffic data stored in the map/statistical traffic data storage device 3 and present status traffic data stored in the route/present status traffic data storage unit 43.

Furthermore, the route search unit 42 also executes a process for obtaining the expected travel time expected arrival point of time, the reliability/estimated error, and the jam level displaying sections/the jam levels of the respective sections.

The route guidance unit 44 compares information of a recommended route stored in the route/present status traffic data storage unit 43 with the current position information outputted from the map matching processor 47, and informs a user of a recommended route with voice using the voice input/output device 4 whether a vehicle should go straight on or turn to the right or left before passing a crossing, and/or by indicating a travel direction on a map displayed on the display 2.

Further, the route guidance unit 44 calculates an expected travel time from the current position outputted from the map matching processor 47 to the destination by using the current time and statistical traffic data stored in the map/statistical traffic data storage device 3 and present status traffic data stored in the route/present status traffic data storage unit 43. Further, it adds the expected travel time thus calculated to the current time to calculate an expected point of time for arrival at the destination, and informs the user of the time.

Further, the route guidance unit 44 measures an actual travel time required from the departure position of the recommended route to the current position outputted from the map matching processor 47. Further, it compares the actual travel time with cost (travel time) for a section between the departure position and the current position, out of cost used by the route search unit 42 in searching the recommended route, and judges the need of searching a recommended route again in accordance with the result of comparison. When the need of searching a recommended route again is determined, the route guidance unit 44 requests the route search unit 42 to search a recommended route again with the current position outputted from the map matching processor 47 as a departure position and with the current time as a departure time.

The data reading unit 48 operates to be prepared for reading from the map/statistical traffic data storage device 3 map data and statistical traffic data in an area which is requested to be displayed on the display 2 or in an area which is requested for the purpose of searching a route (an area covering a departure position and a destination).

The map display processor 45 receives from a map/statistical traffic data storage device 3 map data in an area which is requested to be displayed on the display 2, and generates map drawing commands so that the graphics processor 51 can draw a road, other map constituents, a current position, a destination, and marks such as an arrow for a recommended route in an instructed scale and in an instructed drawing mode. Further, it receives commands outputted from the user operation analyzer 41 to receive from the map/statistical traffic data storage device 3 statistical traffic data which are requested to be displayed on the display 2, and to receive from the route/present status traffic data storage unit 43 present status traffic data which is requested to be displayed on the display 2, and generates map drawing commands so that traffic information items of respective roads are displayed overlapping one another on a map displayed in the display 2.

When the menu display processor 50 receives a command outputted from the user operation analyzer 41, the graphics processor 51 generates menu drawing commands to draw various types of menus and graphs.

The graphics processor 51 receives commands generated in the map display processor 45 and the menu display processor 50, and develops an image in the VRAM 26, as to the image data to be displayed on the display 2.

The departure time candidate storage unit 54 stores a plurality of departure times as departure time candidates. The departure time candidate storage unit 54 is provided with a departure time candidate registration table, in which the departure time candidates are registered. The number of departure time candidates (for example, five), being available for registered in the departure time candidate registration table is predetermined, in accordance with the processing power and the like of the compute unit 1.

The route candidate storage unit 53 stores a recommended route obtained by the route search, a route candidate designated by the user, and the like. The route candidate storage unit 53 is provided with a route registration table, in which links are sequentially registered with respect to each route, from the departure position to the destination.

(Explanation of Operations)

Next, an operation of the in-vehicle type navigation device 1000 will be described.

Figure 8:
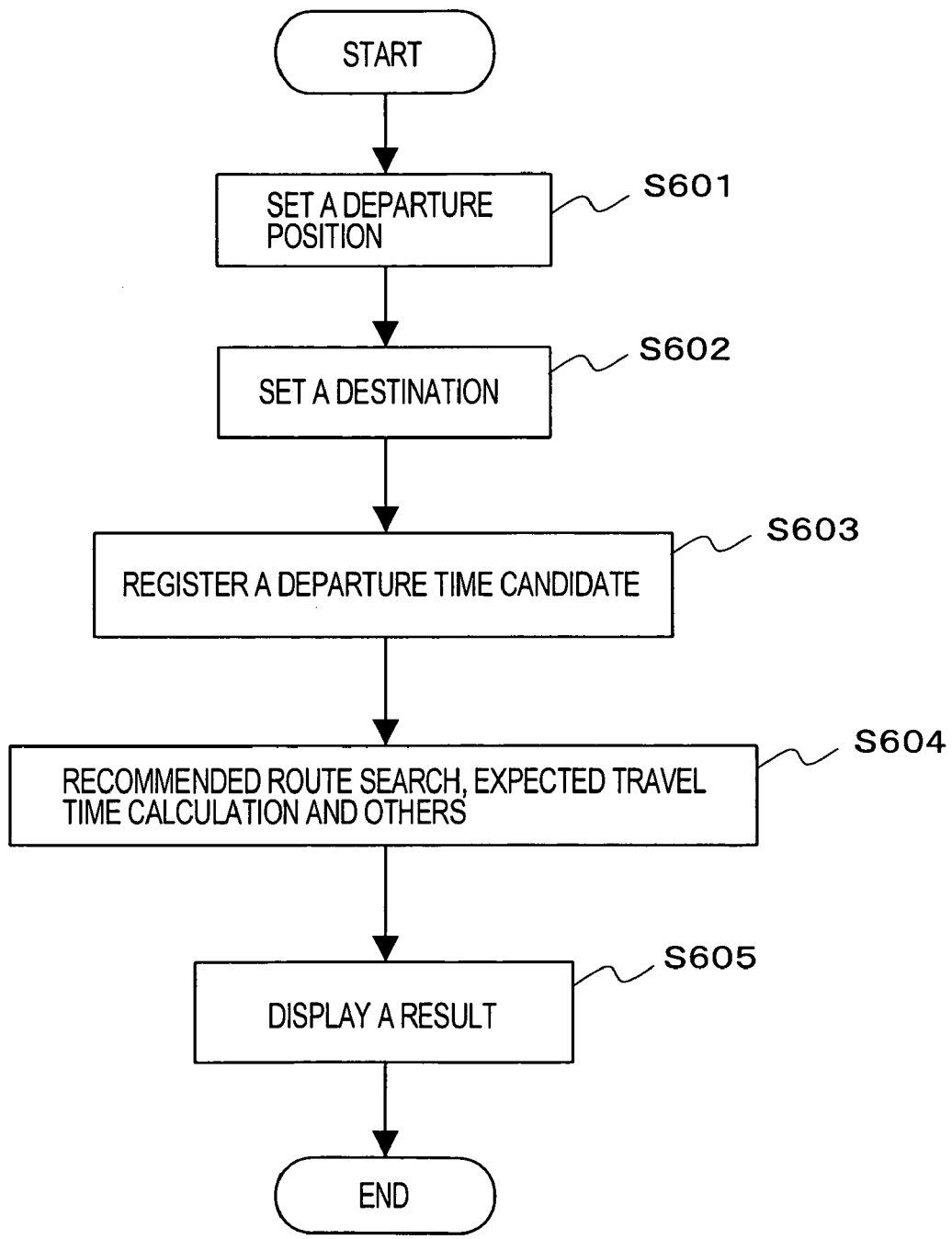
FIG. 8 is a flowchart schematically showing operations of the in-vehicle type navigation device 1000.

FIG. 8 is a flowchart schematically showing an operation of the in-vehicle type navigation device 1000 regarding the present embodiment.

The flow is started when the user operation analyzer 41 receives a user's request for searching a recommended route, calculating an expected travel time or the like, through the voice input/output device 4 or the input device 5. Then, setting a departure position (S601) and setting a destination (S602) are performed, and subsequently, registering the departure time candidate (S603), searching a recommended route, calculating an expected travel time and the like (S604), and displaying the search results and the like (S605) are performed.

Each processing will be specifically explained in the following.

In the departure position and destination setting process (S601, S602) the user operation analyzer 41 sets a departure position and a destination in the route search unit 42. Specifically, when a search request for a recommended route is received, the current position outputted from the map matching processor 47 is set as the departure position. Setting of the destination is performed based on the user's instruction. For example, the user operation analyzer 41 may display information of map constituents registered in the map data read out through the data reading unit 48 from the map/statistical traffic data storage device 3 on the display 2 through the menu display processor 50 and the graphics processor 51, and a user may select a departure position and a destination which are set, out of the information of map constituents on the display through the voice input/output device 4 or the input device 5. Alternatively, information of positions (registered positions) beforehand registered by the user in a storage device such as a RAM 22 or the like may be displayed, and the user may select a departure position and a destination out of the information of the registered positions as displayed through the voice input/output device 4 or the input device 5. Further, the user operation analyzer 41 may display a map specified by the map data read out through the data reading unit 48 from the map/statistical traffic data storage device 3 on the display 2 through the map display processor 45 and the graphics processor 51, and may receive an instruction of a position on the map from the user through the voice input/output device 4 or the input device 5 to select a destination.

Next, a processing for the departure time candidate registration (S603) will be explained, with reference to FIG. 9 and FIG. 10.

Figure 9:
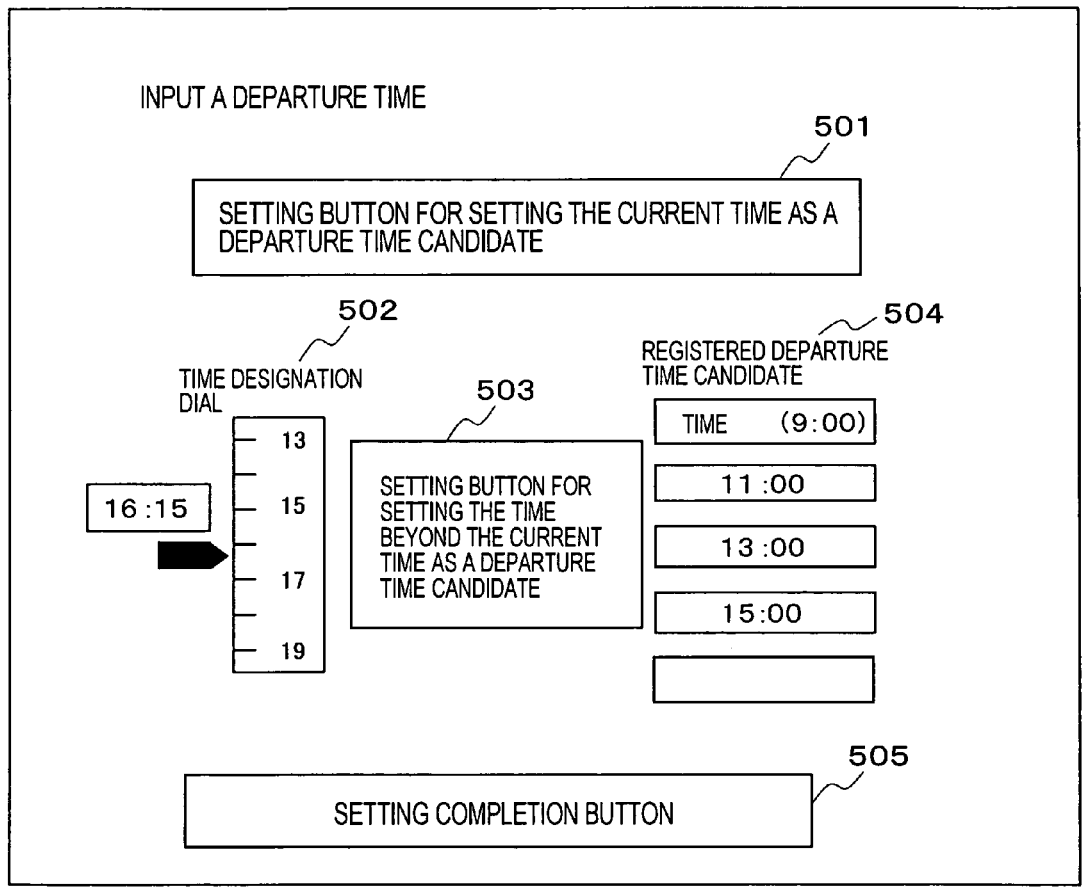
FIG. 9 is a view showing a display example of screen for accepting a departure time candidate registration.

FIG. 9 is a display example of the display 2 upon receiving the departure time candidate registration. On the display 2, there are displayed a setting button 501 for setting the current time as a departure time candidate, a time designation dial 502 for allowing the time beyond the current time to be selectable, a setting button 503 for setting the time beyond the current time as a departure time candidate, a registered departure time candidate 504, and a setting completion button 505. These displays are given by the user operation analyzer 41 via the menu display processor 50 and the graphics processor 51.

Each of the buttons is virtual one provided on the screen. A user is advised, via the voice input/output device 4 or the input device 5, to manipulate a cursor on the screen and the like, so as to press the button.

The time designation dial 502 is a virtual dial provided on the screen. A user is advised, via the voice input/output device 4 or the input device 5, to manipulate a cursor on the screen and the like, so as to turn the dial, thereby allowing the user to designate a time.

As a departure time candidate, in addition to the current time, it is possible to register a plurality of times beyond the current time. When the user presses the setting button 501 for setting the current time as a departure candidate, the user operation analyzer 41 is allowed to register the current time as a departure time candidate. When the user presses the setting button 503 for setting the time beyond the current time as a departure candidate, the user operation analyzer 41 is allowed to register the time designated by the time designation dial 502 as a departure time candidate. As illustrated in FIG. 9, the user operation analyzer 41 displays the departure time candidates 504 which have been registered, so that the user can recognize the candidates.

Figure 10:
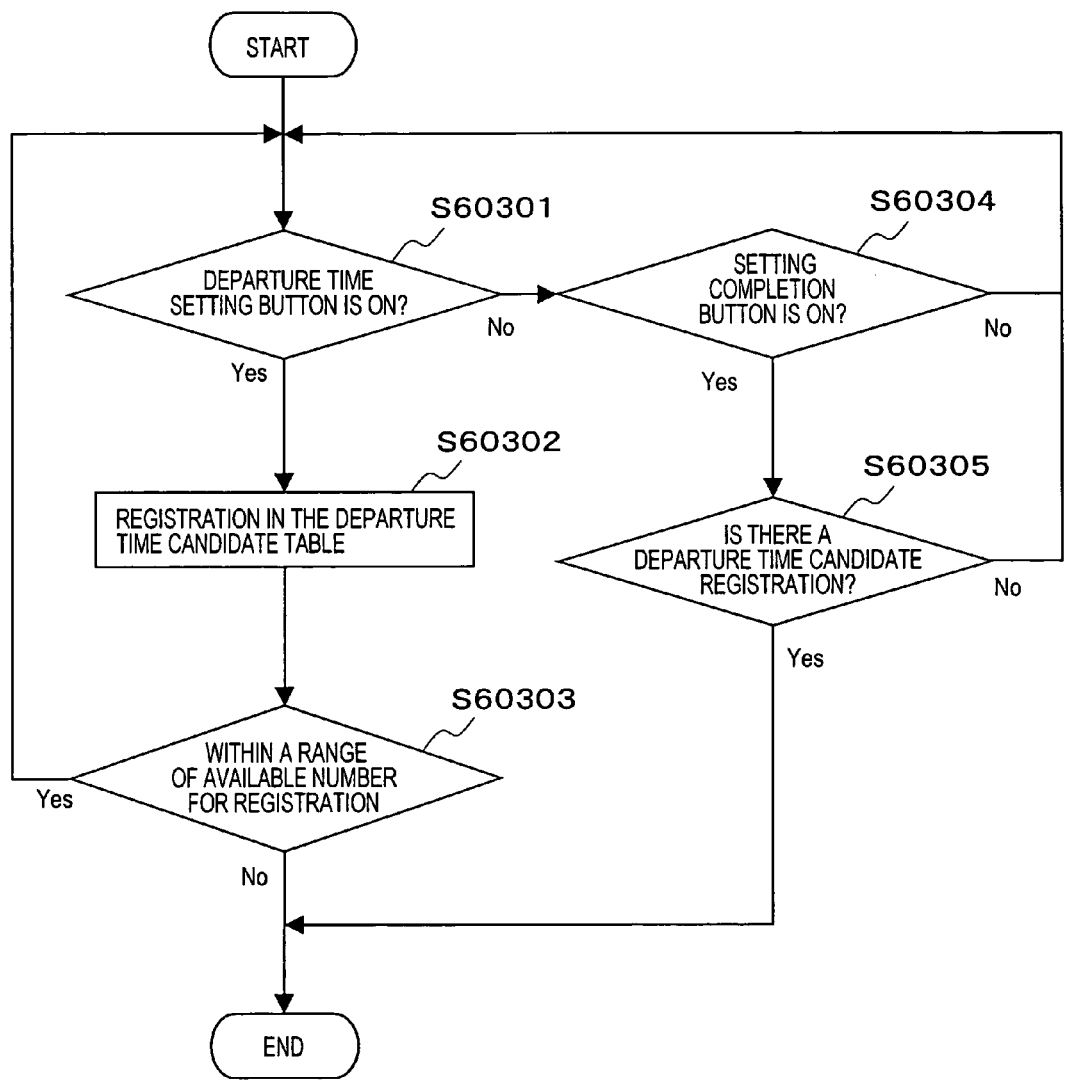
FIG. 10 is a flowchart illustrating a processing for registering the departure time candidate.

FIG. 10 is a flowchart showing a flow of the departure time candidate registration process (S603). Here, first of all, the user operation analyzer 41 determines whether or not the departure time setting button (the setting button 501 which sets the current time as a departure time candidate or the setting button 503 which sets the time beyond the current time as a departure time candidate) has been pressed (S60301). If it has been pressed (Yes in S60301), the user operation analyzer 41 registers the time designated by the time designation dial in the departure time candidate table of the departure time candidate storage unit 54 (S60302).

Next, the user operation analyzer 41 determines whether or not the number of registered departure time candidates is within a range of available number for registering candidates, which is predetermined (S60303). If the number is within the predetermined available number for registration, the process is returned to S60301 again. If it is over the available number for registration, the processing is completed.

On the other hand, if the departure time setting button has not been pressed in S60301 (No in S60301), the user operation analyzer 41 determines whether or not the setting completion button has been pressed. If the setting completion button is not pressed, the process returns to S60301. If it is pressed, the user operation analyzer 41 determines whether or not a departure time candidate has already been registered (S60305). If there is no registration, the process returns to S60301. If there is already a registration of the departure time candidate, the process is completed.

It is also possible to allow the user to designate as a departure time candidate, a date beyond today, not limited to today (the day when the user is performing the operation), and to set a specific time within the day.

According to this flow, it is possible to register a plurality of departure times as departure time candidates. Within the predetermined number available for registering the departure time candidates, the registration of the departure time candidates can be accepted. Further, even when the number of registration does not reach the number available for registration, accepting the registration of departure time candidates can be terminated by pressing the setting completion button, and then the process can be shifted to the subsequent step.

Next, the route search processing, expected travel time calculation processing and the like will be explained.

Figure 13:
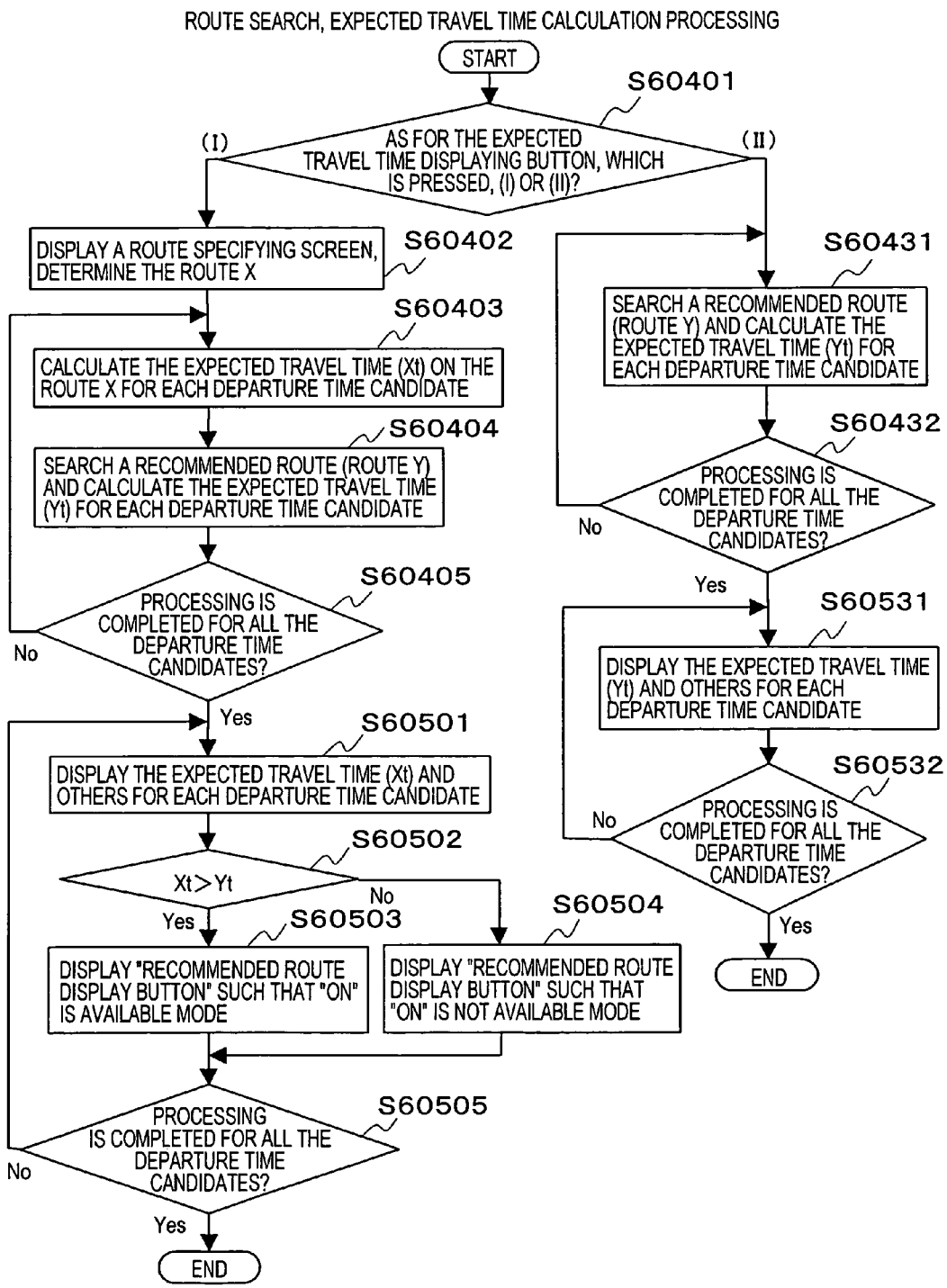
FIG. 13 is a flowchart for schematically explaining a process for route searching and expected travel time calculation.

FIG. 13 is a flowchart showing a processing flow of the route search processing, the expected travel time calculation and the like.

Figure 14:
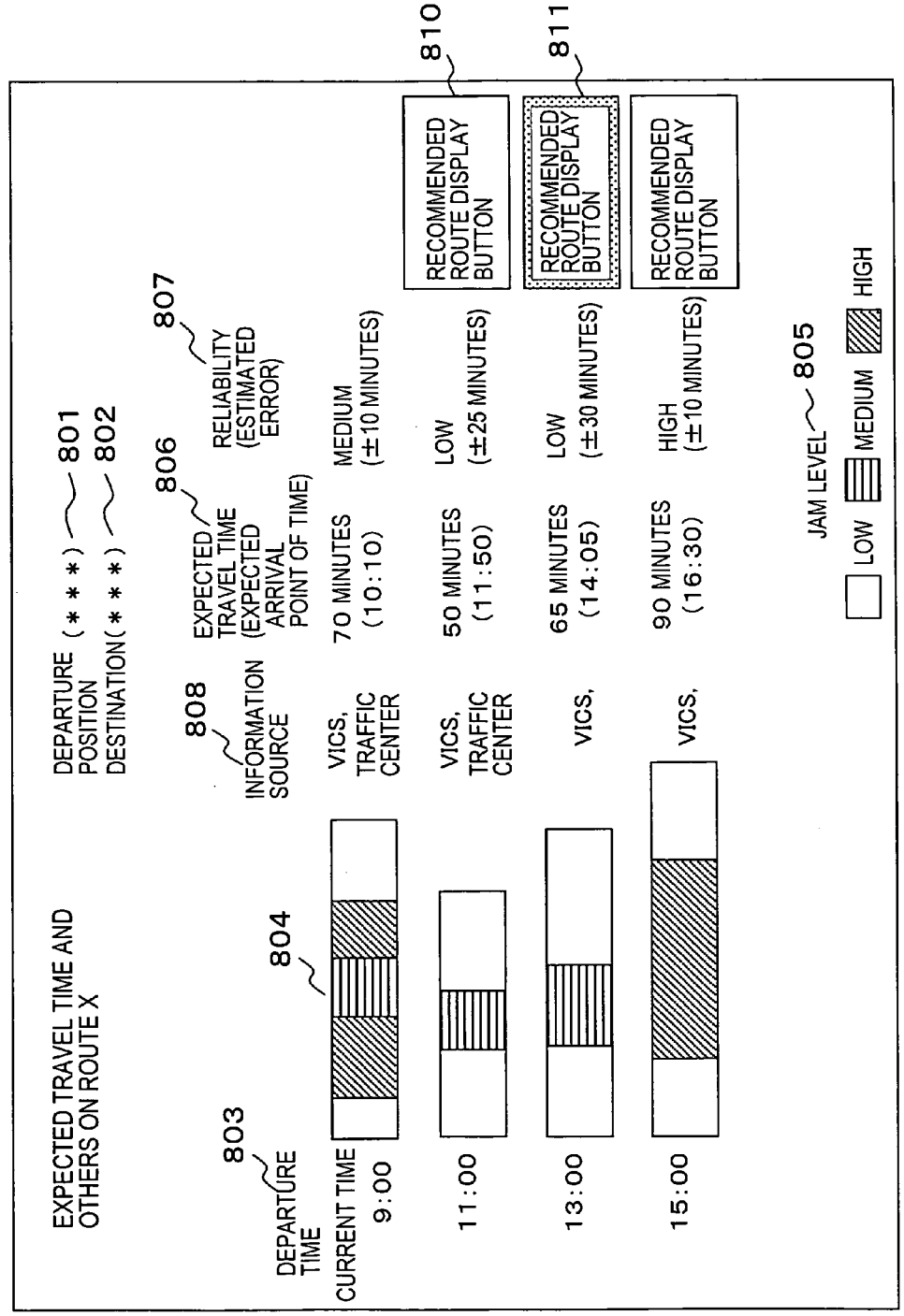
FIG. 14 is a view showing an example of graph display as to the expected travel time with respect to each departure time candidate.
Figure 16:
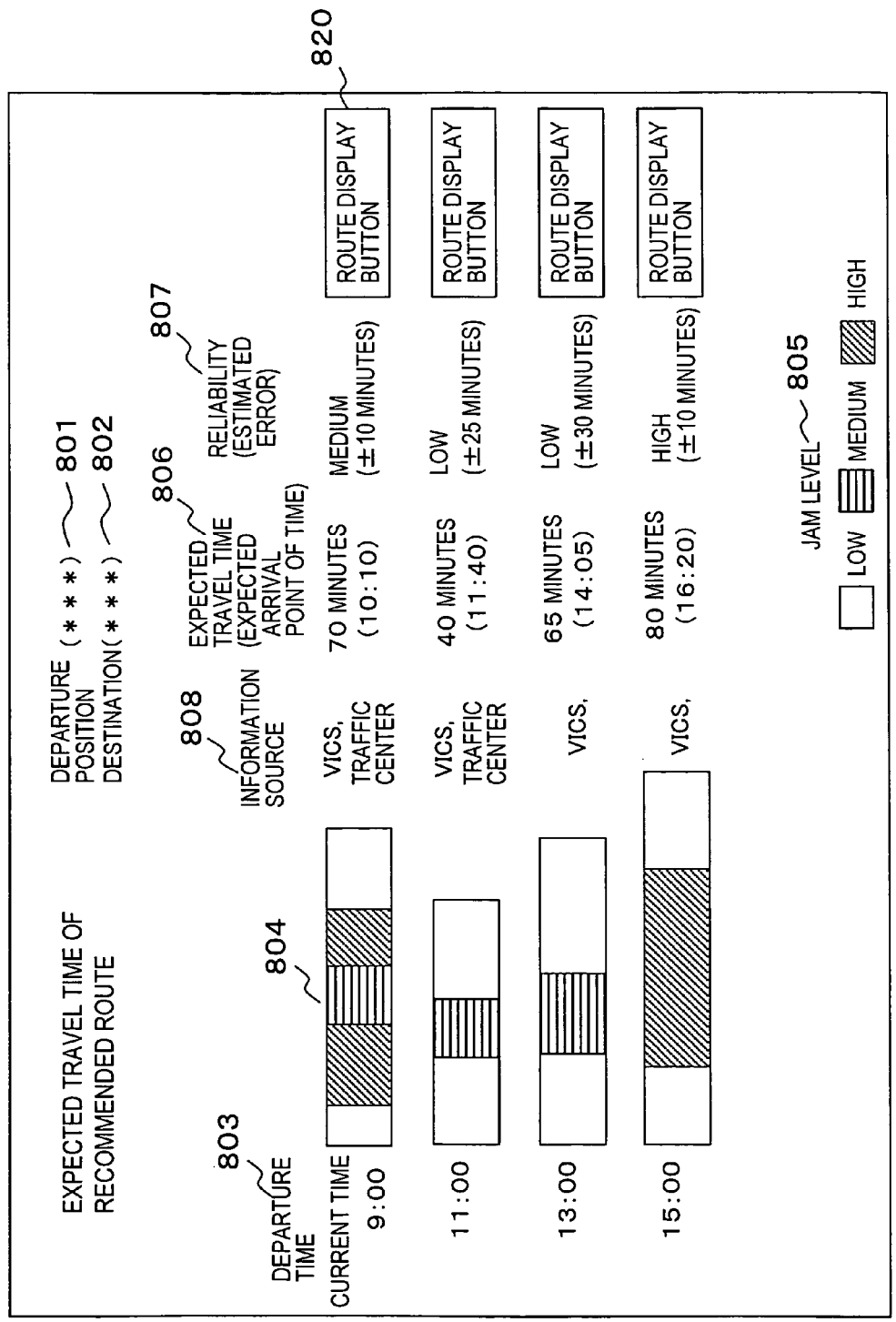
FIG. 16 is a view showing an example of graph display as to the expected travel time of a recommended route with respect to each departure time candidate.

It is to be noted here the in-vehicle type navigation device 1000 of the present embodiment features that it conducts a search for a recommended route, calculation of the expected travel time and the like as to a plurality of departure times (departure time candidates), and displays the results. In this regard, the present embodiment includes two display modes. That is, (1) as shown in FIG. 14, a mode which shows a comparative display regarding the expected travel time and the like with respect to each departure time candidate, in the case where a travel is made by way of an identical specific route (route X); and (2) as shown in FIG. 16, a mode which searches for a recommended route (route Y) with respect to each departure time candidate and shows a comparative display regarding the expected travel time and the like. In the mode (2), there may be a case that the recommended route is different by departure time candidate, and thus the comparative display of the expected travel time and the like is made as to each recommended route.

According to the mode (1), it is possible to display the expected travel time, a degree of traffic jam and the like with respect to each departure time candidate being different from one another, as for a route familiar to the user. The user can determine what time to depart so as to enjoy the optimum travel at one's convenience. The mode (2) is convenient for a user who wants to arrive at a destination in the shortest time irrespective of the route.

Figure 11:
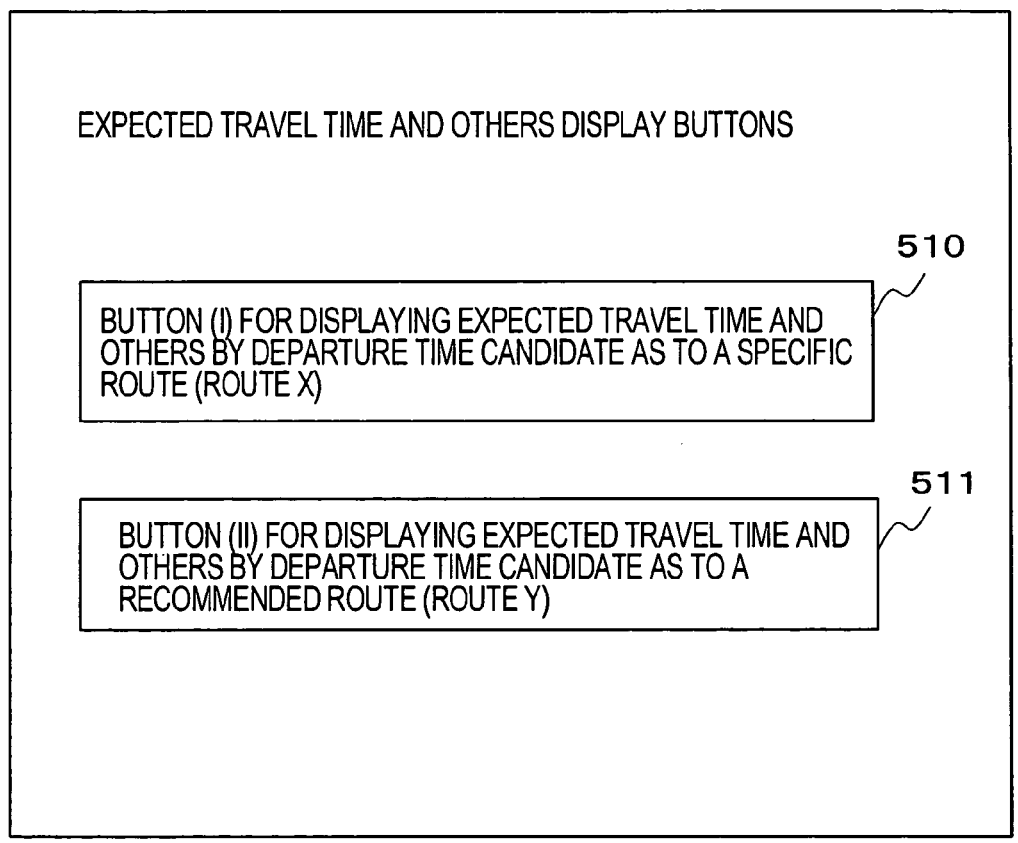
FIG. 11 is a view showing a display example of buttons for accepting an instruction to display expected travel time and others.

First of all, as shown in FIG. 13, the user operation analyzer 41 determines which display mode the user has selected (S60401). At this moment, as shown in FIG. 11, the display 2 displays (1) Button (I) for displaying expected travel time and others by departure time candidate as to a specific route (route X) 510, and (2) Button (II) for displaying expected travel time and others by departure time candidate as to a recommended route (route Y) 511.

Firstly, a case where the former button (I) 510 is pressed will be explained.

Figure 12:
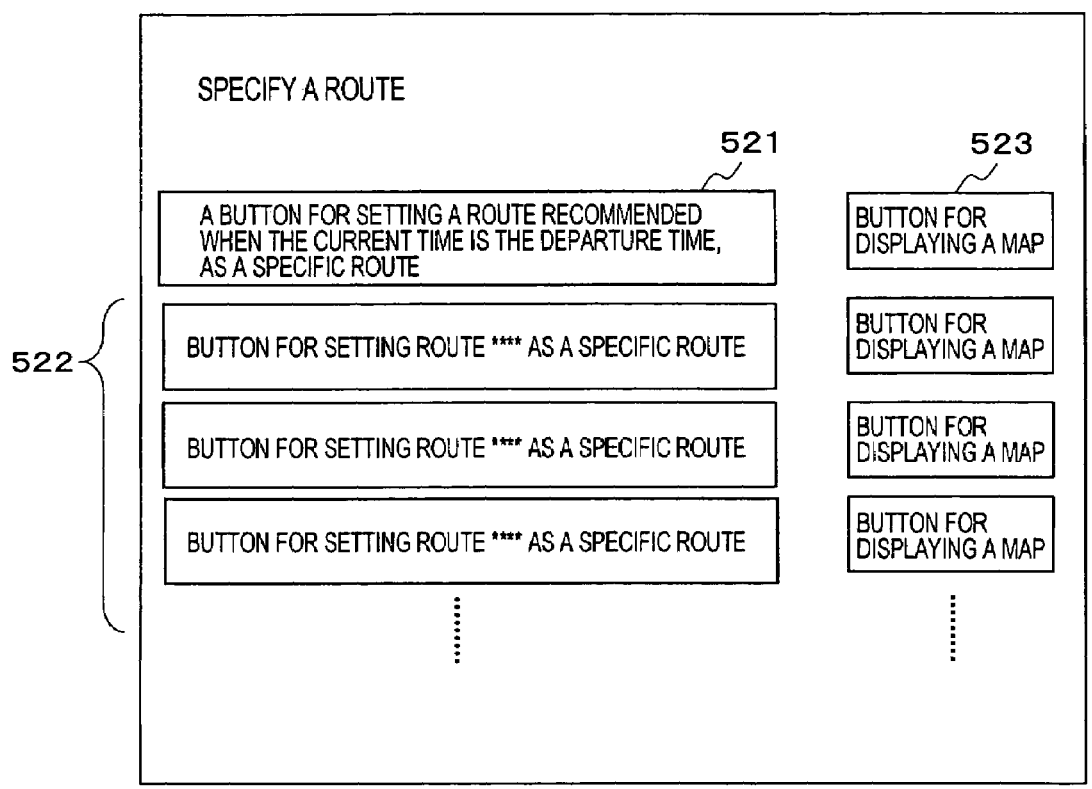
FIG. 12 is a view showing a display example of a screen for accepting route identification.

When the button (I) is pressed, as shown in FIG. 12, the display 2 displays a screen which advises the user to specify a route (S60402). The display screen includes a button 521 which sets as a specific route, a route which is recommended if the current time is the departure time, and buttons 522 which set as a specific route any one of the routes stored in the route candidate storage unit 53. In addition, a button 523 may also be provided, which displays a map as to the route.

When the buttons 521, 522 are pressed, the user operation analyzer 41 determines the route displayed on the button thus pressed as a specific route (route X) (S60402). When the button 521 which sets as the route X the route recommended when the current time is to be a departure time, the user operation analyzer 41 instructs the route search unit 42 to search for a route at the current time, and to obtain a recommended route. Then, the recommended route thus searched is set as the route X. Detailed explanations of the route search processing will be made in the following. On the other hand, when the button 522 is pressed which sets as a specific route any one of the routes stored beforehand in the route candidate storage unit 53, the user operation analyzer 41 sets as the route X any one of the route stored in the route candidate storage unit 53.

Subsequently, the route search unit 42 receives an instruction from the user operation analyzer 41, and calculates an expected travel time (Xt) on the route X with respect to each departure time candidate (S60403). At this moment, an expected arrival point of time, reliability/estimated error, and a jam level displaying section/jam levels of the respective sections are also obtained. Then, the route search unit 42 searches for a recommended route (route Y) by departure time candidate, and obtains the expected travel time (Yt) on the route Y. Each process for obtaining the expected arrival point of time, the reliability/estimated error and the like will be explained in detail later. These processes of S60403 and S60404 are performed as to all of the departure time candidates in the departure time candidate table (S60405).

(Display processing) Next, a process for displaying the information obtained as described above will be explained.

In the above manner, when the expected travel time/ expected arrival point of time, the reliability/estimated error, and the jam level displaying sections/the jam levels of the respective sections are decided, the display 2 displays those information items (S60501). Concretely, the menu display processor 50 graphically displays the recommended routes on the display 2 through the graphics processor 51 so that the expected travel time/the expected arrival point of time and the jam level displaying sections/the jam levels of the respective sections can be recognized. Further, the menu display processor 50 displays the reliability/estimated error of the expected travel time and the information source of the traffic information statistical values used for calculation of the expected travel time/the expected arrival point of time.

FIG. 14 shows an example of graphical representation of those information items. This example shows a case where a route recommended when the current time is to be a departure time in S60402 in FIG. 13 is set as the route X. Then, the expected travel time and others on the route X are respectively displayed for the departures at the current time (9:00), 11:00, 13:00 and 15:00. The length of the bar graph 804 is proportional to the expected travel time 806. Further, the graph 804 is composed of at least one jam level displaying section indicative a jam level 805, and a length of the displaying section is also in proportion to the travel time for the section. The user can judge the status of traffic congestion of the route X by confirming a ratio of a jam level displaying section of high jam level in the graph. Further, reliability (estimated error) 807 of the expected travel time (expected arrival point of time) is represented corresponding to expected travel time (expected arrival point of time) 806, and so the user can confirm what degree of error possibly has in the case where the route X is used. Further, an information source 808 of the traffic information statistical values used for calculation of expected travel time (expected arrival point of time) is represented corresponding to the expected travel time (expected arrival point of time) 806. By referring the information source 808, the user can roughly judge reliability of the expected travel time (expected arrival point of time) 806.

Explanations will be given returning to the flowchart of FIG. 13. The menu display processor 50 displays the expected travel time (Xt) and others with respect to each departure time candidate via the graphics processor 51 (S60501), and then the menu display processor 50 determines whether Xt>Yt. If Xt>Yt, that is, the expected travel time on the route Y is shorter than the expected travel time on the route X, the menu display processor 50 displays the recommended route display button 810 in a mode available to be "ON". If not Xt>Yt, that is, the expected travel time on the route X is equal to the expected travel time on the route Y, the menu display processor 50 displays the recommended route display button 811 in a mode not available to be "ON". This is intended for the user to select whether or not the shortest route is displayed, if the shortest route exists. If there is not the shortest route other than the route X, as shown in FIG. 14, the display 2 may change the appearance of the recommended route display button 811, such as hatching, so as to notify that the shortest route does not exist other than the route X. Alternatively, the recommended route display button 810 may not be displayed. In this way, it is possible for the user to easily recognize whether or not the shortest route exists, other than the route X.

The above processes (S60501 to S60504) are performed as to all the departure time candidates in the departure time candidate table (S60505).

Here, a process in the case where the recommended route display button 810 is pressed will be explained. When the recommended route display button 810 is pressed, as shown in FIG. 15, the display 2 displays a recommended route (route Y) at the same departure time candidate. In the example of FIG. 15, the route X 910 and the route Y 905 are simultaneously displayed so that the user can easily compare the two routes. Further, the recommended route 905 between the departure position and the destination 904 is displayed on the map 909, so that the jam level 906 in each jam level displaying section can be identified. In FIG. 15, the reference numeral 901 indicates the departure time, the numeral 907 indicates the expected travel time up to the destination (expected arrival point of time), the numeral 908 indicates the reliability (estimated error) of the expected travel time (expected arrival point of time) 907, and the numeral 911 indicates the information source of the traffic information statistical values used in calculating the expected travel time (expected arrival point of time) 907. It is also possible to display with respect to each jam level displaying section, an expected arrival point of time to reach respective jam level displaying section (an expected arrival point of time at the termination node of a final link constituting a previous jam level displaying section of the targeted jam level displaying section), in such a manner as aligning with the starting position of the targeted jam level displaying section on the map. It may be also possible to display each jam level displaying section, in such a manner as identifiable whether the display of the jam level displaying section is based on the traffic information statistical values or based on the present status traffic data.

Further, the display 2 may create a display so that it is identifiable whether or not the jam level and the like are obtained from interpolation data. In FIG. 15, it is indicated that the information source of the jam level is obtained from the interpolation data, according to the mark 930. Alternatively, it is also possible to create a display with a variation in colors or shapes (frames) between the actual data and the interpolation data, so that it is identifiable whether it is based on the interpolation data or not. Moreover, it is also possible not to display the jam level and the like in the case where the information is obtained from the interpolation data.

Furthermore, the display 2 may be provided with a button 920 which replaces the route X with the route Y on the display screen. For example, upon taking a rest in a parking area or a service area, a user may want to display an optimum route for the time after the rest. In such a case, if the user takes a rest after pressing the button to replace the current route (route X) with the recommended route (route Y), it is possible to display an optimum route immediately when the user starts the engine after the rest. When this button 920 is pressed, the route search unit 42 replaces the current route (route X) with a recommended route (route Y).

Next, a process will be explained returning to FIG. 11, in the case where the button (II) for displaying expected travel time and others by departure time as to a recommended route (route Y) is pressed. In the flowchart of FIG. 13, this process corresponds to S60431, S60432, S60531, and S60532.

Firstly, the route search unit 42 searches for a recommended route (route Y) with respect to each departure time candidate, and obtains an expected travel time/expected arrival point of time, reliability/estimated error, jam level displaying section/jam levels of respective sections, and the like as to the route thus searched (S60431, S60432).

Processes for the route search, for obtaining the expected travel time and the like will be described in detail later. Next, the display 2 receives an instruction from the menu display processor 50 and the graphics processor 51, and displays with respect to each departure time candidate, an expected travel time/expected arrival point of time, reliability/estimated error, jam level displaying section/jam levels of respective sections and the like as to the recommended route (route Y). FIG. 16 shows a display example. Since the display processing is performed basically in a similar manner as that of the display example of FIG. 14, explanations of the display processing in FIG. 16 are omitted.

The display screen is provided with a route display button 820. This is a button for receiving a request from a user to display a map as to the route Y. When the route display button 820 is pressed, the display 2 receives an instruction from the map display processor 45, and displays the map as to the route Y. For displaying the map, a similar configuration as that of the above described FIG. 15 can be taken.

In the above description, two display modes of the present embodiment have been explained.

(Details of Route Search Processing)

Here, details of the route search processing will be explained. Following is an example of the route search processing.

The route search processing explained here includes a search processing by use of only the statistical traffic information (route search processing A), and a search processing by use of the statistical traffic information and the present status traffic information (route search processing B). If the current time is the departure time, the route search processing B is mainly performed, and if the departure time is set to be a time beyond the present time, the route search processing A is performed.

Figure 17:
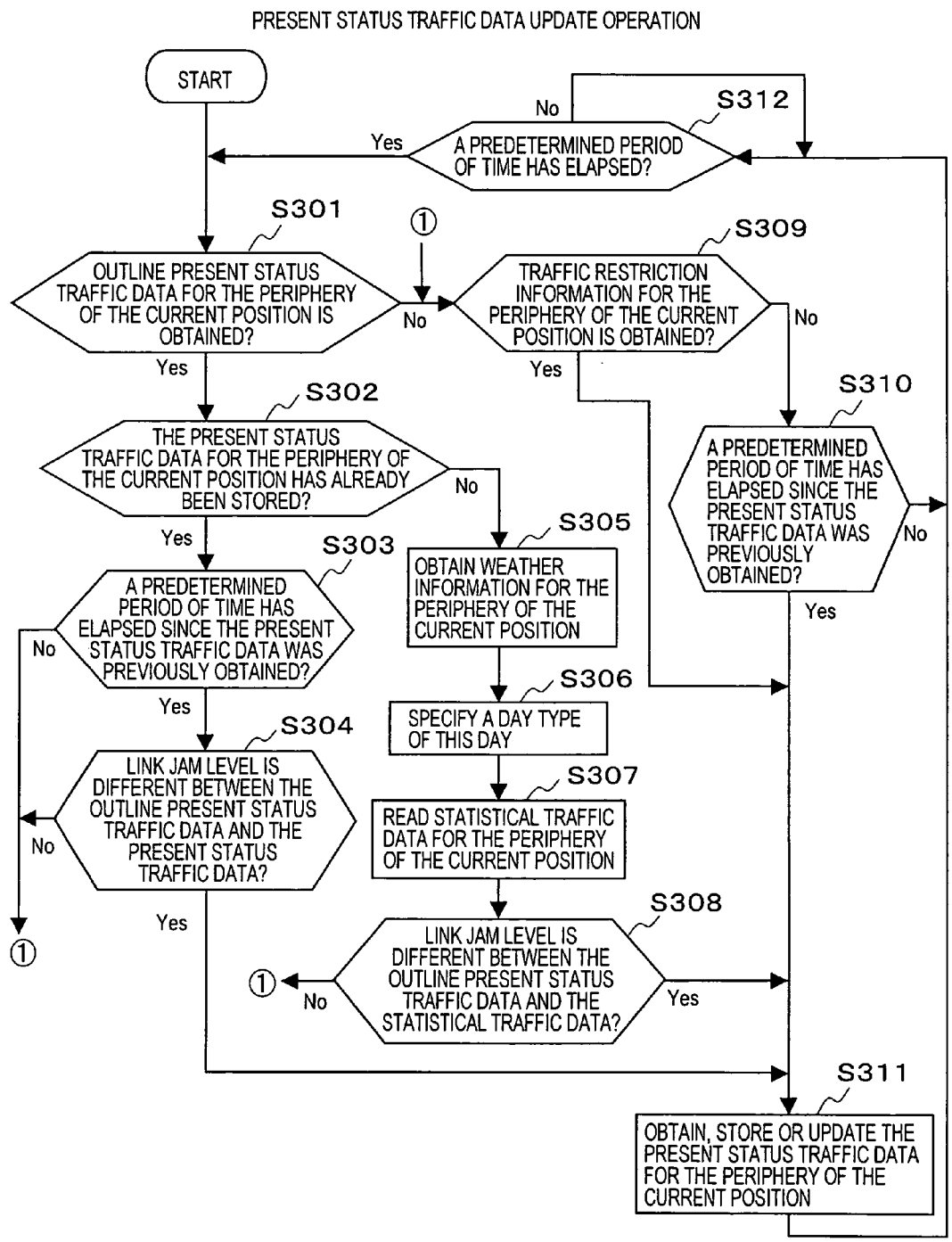
FIG. 17 is a flowchart illustrating a present status traffic data update operation.

First of all, an update operation of the present status traffic information used in the route search processing B will be explained. FIG. 17 is a flowchart illustrating a present status traffic data update operation.

First, the present status traffic data update unit 52 reads out the first conversion table from the map/statistical traffic data storage device 3 through the data reading unit 48. Then, by using the first conversion table, the present status traffic data update unit 52 specifies a mesh ID of a mesh area including the periphery of the current position outputted from the map matching processor 47. Next, the present status traffic data update unit 52 judges whether outline present status traffic data having a mesh ID of a mesh area including the periphery of the current position is included in outline present status traffic data received from the FM multiplexing broadcasting station 5000 through the FM multiplexing broadcasting receiver 12 (S301).

In the case where outline present status traffic data having the mesh ID of the mesh area including the periphery of the current position is included in outline present status traffic data received from the FM multiplexing broadcasting station 5000 (Yes in S301), the present status traffic data update unit 52 investigates whether the present status traffic data having the mesh ID of the mesh area including the periphery of the current position have already been stored in the route/present status traffic data storage unit 43 (S302).

In S302, in the case where the present status traffic data having the mesh ID of the mesh area including the periphery of the current position have already been stored, the present status traffic data update unit 52 uses a built-in timer or the like (not shown) to further investigate whether a first predetermined period of time (a time interval, for example, 100 minutes, shorter than which a change in traffic situation cannot be expected) has elapsed (S303). In the case where the first predetermined period of time has elapsed (Yes in S303), the present status traffic data update unit 52 obtains a difference between the degree of link jam indicated by the outline present status traffic data and the degree of link jam indicated by present status traffic data for respective links included in the mesh area including the periphery of the current position. Then the present status traffic data update unit 52 investigates whether the number of links in which the difference is larger than a predetermined value (or a ratio of the number of links to the number of all links included in the mesh area including the periphery of the current position) is larger than a predetermined threshold value (S304).

In the case where the number of links in which the difference is larger than the predetermined value (or a ratio of the number of links to the number of all links included in the mesh area including the periphery of the current position) is larger than the predetermined threshold value (Yes in S304), the present status traffic data update unit 52 accesses to the traffic information distribution center 2000 through the network connection device 10 to obtain present status traffic data having the mesh ID of the mesh area including the periphery of the current position from the traffic information distribution center 2000. And the present status traffic data update unit 52 stores the present status traffic data thus obtained in the route/present status traffic data storage unit 43 (S311). Then the processing of the present status traffic data update unit 52 proceeds to S312.

Meanwhile, in the case where the first predetermined period of time has not elapsed since present status traffic data at the last time was obtained (No in S303), or in the case where the number of links in which the difference is larger than the predetermined value (or a ratio of the number of links to the number of all links included in the mesh area including the periphery of the current position) is smaller than the predetermined threshold value (No in S304), the processing of the present status traffic data update unit 52 proceeds to S309.

In the case where the present status traffic data having the mesh ID of the mesh area including the periphery of the current position have not yet been stored in the route/present status traffic data storage unit 43 in S302, the present status traffic data update unit 52 obtains the mesh ID of the mesh area including the periphery of the current position and weather information of a time zone including the current time from the FM multiplexing broadcasting station 5000 through the FM multiplexing broadcasting receiver 12 (S305). The present status traffic data update unit 52 may judge weather from the state of the operation of a wiper and an outside air temperature received through the in-vehicle LAN device 11, and make use of the result of judgment as weather information.

Subsequently, the present status traffic data update unit 52 reads out the second conversion table from the map/statistical traffic data storage device 3 through the data reading unit 48. Then the present status traffic data update unit 52 specifies a day type (departure day) by using the second conversion table (S306). In the case where the date of this day is not registered in the second conversion table, a day type corresponding to this day may be specified by using the software installed in the in-vehicle type navigation device to perform the processing of specifying a day type on the basis of the date through the calculation logic. In this manner, in the case where a range of the date registered in the second conversion table is exceeded, the processing can be continued and executed.

Subsequently, the present status traffic data update unit 52 reads out from the map/statistical traffic data storage device 3 through the data reading unit 48 statistical traffic data 320 having the mesh ID of the mesh area including the periphery of the current position. Then the present status traffic data update unit 52 specifies traffic information statistical values of a time zone including the current time on the basis of the read statistical traffic data 320 for respective links corresponding to the day type specified in S305 and the weather type specified from the weather information obtained in S306 (S307).

Then the present status traffic data update unit 52 finds a difference between the degree of link jam indicated by the outline present status traffic data and the degree of link jam indicated by the specified traffic information statistical values for respective links included in the mesh area including the periphery of the current position. And the present status traffic data update unit 52 investigates whether the number of links in which the difference is larger than the predetermined value (or a ratio of the number of links to the number of all links included in the mesh area including the periphery of the current position) is larger than the predetermined threshold value (S308).

And in the case where the number of links in which the difference is larger than the predetermined value (or a ratio of the number of links to the number of all links included in the mesh area including the periphery of the current position) is larger than the predetermined threshold value in S308, the processing of the present status traffic data update unit 52 proceeds to S311 to store in the route/present status traffic data storage unit 43 present status traffic data having the mesh ID of the mesh area including the periphery of the current position and obtained from the traffic information distribution center 2000 (S311). Then the processing of the present status traffic data update unit 52 proceeds to S312. Meanwhile, in the case where the number of links is smaller than the predetermined threshold value, the processing of the present status traffic data update unit 52 proceeds to S309.

Subsequently, in S309, the present status traffic data update unit 52 investigates whether traffic restriction information having the mesh ID of the mesh area including the periphery of the current position is included in traffic restriction information received from the FM multiplexing broadcasting station 5000 through the FM multiplexing broadcasting receiver 12. In the case where such traffic restriction information is included or it has been changed, the processing of the present status traffic data update unit 52 proceeds to S311 to store in the route/present status traffic data storage unit 43 present status traffic data having the mesh ID of the mesh area including the periphery of the current position and obtained from the traffic information distribution center 2000 (S311). Then the processing of the present status traffic data update unit 52 proceeds to S312. Meanwhile, in the case where such traffic restriction information is not included or has not been changed, the processing of the present status traffic data update unit 52 proceeds to S310.

Subsequently, in S310, the present status traffic data update unit 52 uses a built-in timer or the like (not shown) to investigate whether a second predetermined period of time (a time interval, for example, 30 minutes, during which a change in traffic situation can be expected and which is longer than the first predetermined period of time) has elapsed. In the case where the second predetermined period of time has elapsed (Yes in S310), the processing of the present status traffic data update unit 52 proceeds to S311 to store in the route/present status traffic data storage unit 43 present status traffic data having the mesh ID of the mesh area including the periphery of the current position and obtained from the traffic information distribution center 2000 (S311). Then the processing of the present status traffic data update unit 52 proceeds to S312. Meanwhile, in the case where the second predetermined period of time has not elapsed (No in S310), the processing of the present status traffic data update unit 52 proceeds immediately to S312.

In S312, the present status traffic data update unit 52 uses a built-in timer or the like (not shown) to wait until a third predetermined period of time (a time interval, for example, 5 minutes, during which update of outline present status traffic data can be expected and which is shorter than the first predetermined period of time) has elapsed, and returns to S301.

In this flow, new present status traffic data is obtained to be stored in the route/present status traffic data storage unit 43 in one of the cases: (1) the degree of link jam indicated by the statistical traffic data and the degree of link jam indicated by the latest outline present status traffic data are different from each other, (2) the degree of link jam indicated by the present status traffic data having been stored in the route/present status traffic data storage unit 43 and the degree of link jam indicated by the latest outline present status traffic data are different from each other, (3) traffic restriction information in the periphery of the current position is obtained, and (4) the second predetermined period of time has elapsed since present status traffic data was obtained at the last time. In the case where the first predetermined period of time has not elapsed since present status traffic data was obtained at the last time, however, present status traffic data is not obtained. In this manner, while frequency of access to the traffic information distribution center 2000 is suppressed, it is possible to prevent present status traffic data from becoming too old.

As described above, the update operation of the present status traffic information has been explained.

Figure 18:
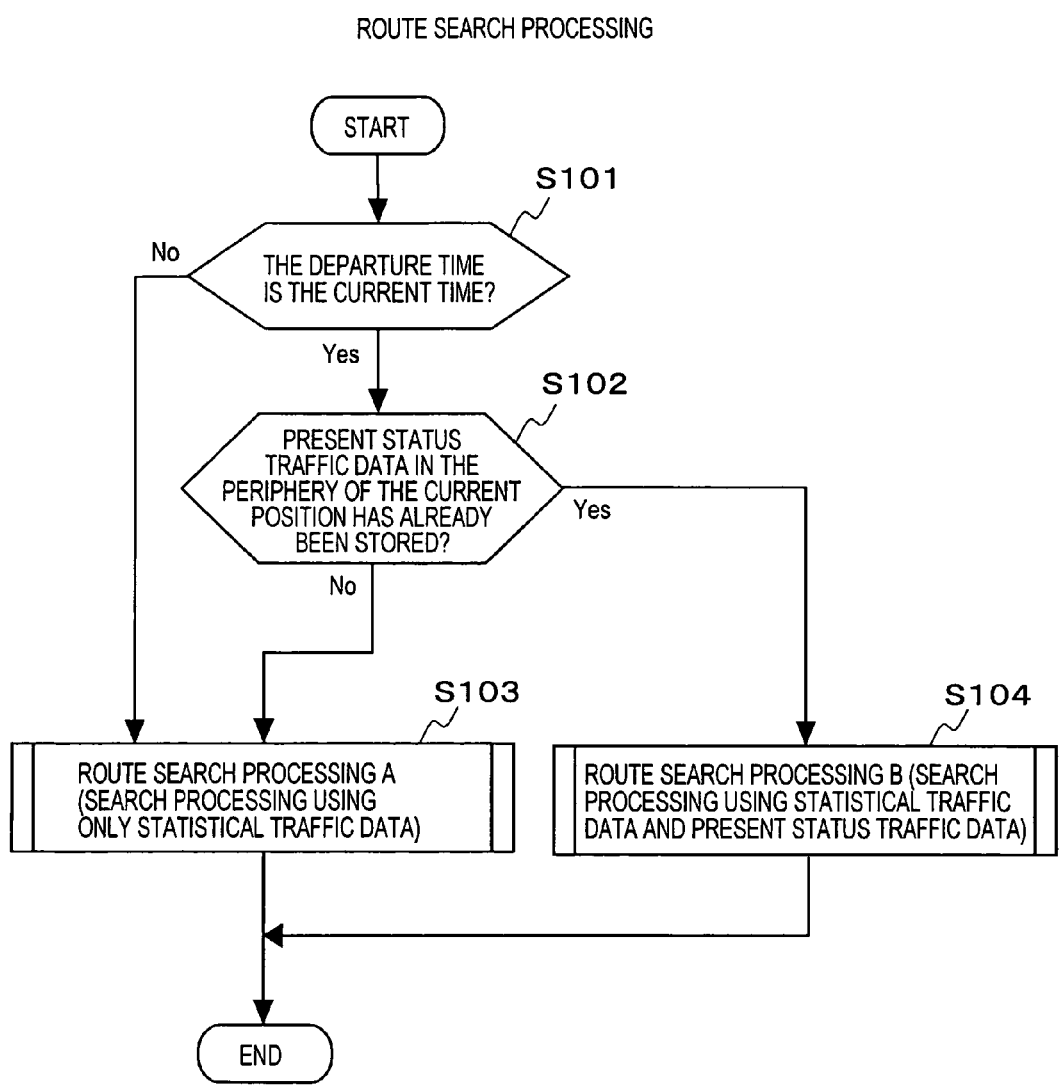
FIG. 18 is a flowchart for explaining a recommended route search operation.

Next, the route search processing will be explained with reference to the flowchart of FIG. 18.

First of all, the route search unit 42 determines whether or not the current time is set as the departure time (S101). If the departure time is the current time (Yes in S101), the process is shifted to S102. On the other hand, if the departure time is not the current time (No in S101) the process is shifted to S103.

If the departure time is the current time (Yes in S101), the route search unit 42 investigates whether present status traffic data having the mesh ID of the mesh area including the periphery of the current position have been stored in the route/present status traffic data storage unit 43 (S102). In the case where such present status traffic data is not stored in S102, the processing of the route search unit 42 proceeds to S103 to make use of the statistical traffic data stored in the map/statistical traffic data storage device 3 to search a recommended route (route search processing A). Meanwhile, in the case where such present status traffic data is stored, the processing of the route search unit 42 proceeds to S104 to make use of the present status traffic data stored in the route/present status traffic data storage unit 43, and the statistical traffic data stored in the map/statistical traffic data storage device 3 to search a recommended route (route search processing B).

Figure 19:
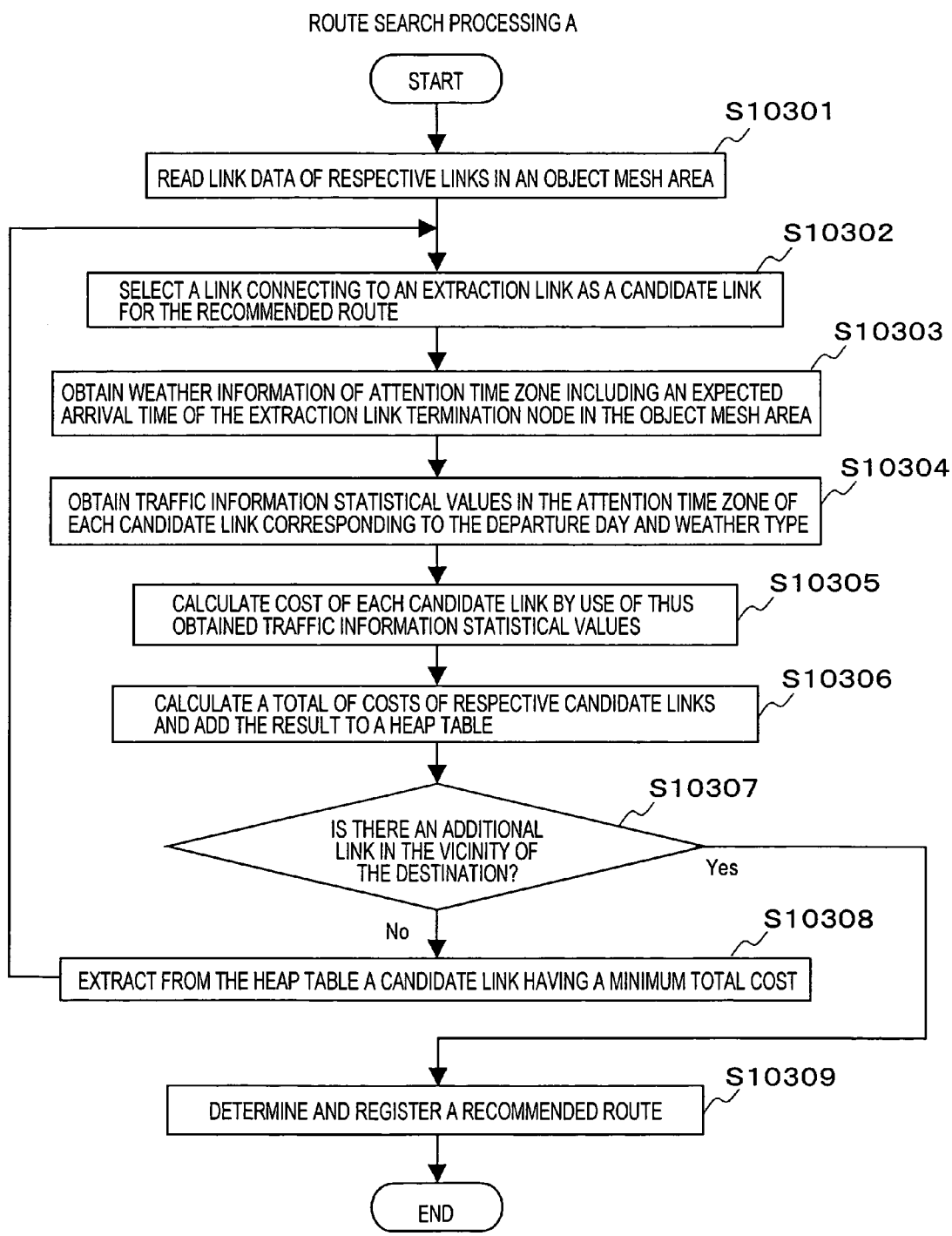
FIG. 19 is a flowchart illustrating a processing (route search processing A) in S103 shown in FIG. 18.

Next, the above route search processing A will be explained. FIG. 19 is a flowchart illustrating a processing (route search processing A) in S103 shown in FIG. 18.

First, the route search unit 42 reads out the above first conversion table from the map/statistical traffic data storage device 3 through the data reading unit 48. Then the route search unit 42 uses the first conversion table to specify mesh IDs of respective mesh areas included in areas including a departure position and a destination which have been set. Then the route search unit 42 obtains respective link data 312 registered in the respective map data 310 having the specified mesh IDs from the map/statistical traffic data storage device 3 through the data reading unit 48. Next, the route search unit 42 reads out the above second conversion table, from the map/statistical traffic data storage device 3 through the data reading unit 48. And the route search unit 42 uses the second conversion table to specify a day type of departure day. In the case where the date of a departure day is not registered in the second conversion table, a day type corresponding to the departure day may be specified by using the software installed into the in-vehicle type navigation device to perform the processing of specifying a day type of the departure day on the basis of the date through the calculation logic. Thus the processing can be continued and executed even in the case where a range of a date registered in the second conversion table is exceeded (S10301).

Next, the route search unit 42 uses the link data 312 read out from the map/statistical traffic data storage device 3 in S10301 to select links, in each of which a termination node of a link (referred to as an extraction link) extracted from a heap table in S10308 described later is made its initiation node, as candidates of links (referred to as candidate links) constituting a recommended route. In the case where the processing in S10308 is not performed, that is, in the initial stage in which no link is registered in the heap table, however, the route search unit 42 selects at least one link on which a departure position is located, or which is close to the departure position as the candidate link instead of selecting links whose initiation node are the termination node of the extraction link as the candidate links (S10302).

Here, the heap table is one which registers link data of the candidate link together with a total cost (total travel time) needed until the termination node of the candidate link from the departure position, and the heap table is stored in a storage device such as a memory or the like.

Next, the route search unit 42 calculates an expected point of time at which the termination node of the extraction link is reached. The expected point of time can be calculated by adding to the departure point of time the total cost (total travel time) of the extraction link registered in the heap table. Further, the route search unit 42 uses the first conversion table to specify a mesh ID of a mesh area in which the termination node of the extraction link is located. In the case where the processing in S10308 is not performed, that is, in the initial stage in which no link is registered in the heap table, however, the route search unit 42 specifies a mesh ID of a mesh area in which the departure position is located. Then the route search unit 42 obtains weather information comprising the specified mesh ID and an object time zone (referred to as an attention time zone) to which an expected point of time at which the termination node of the extraction link is reached belongs, through the FM multiplexing broadcasting receiver 12 (S10303). The weather is judged on the basis of status information of the operation of a wiper received and outside air temperature information through the in-vehicle LAN device 11, this result of the judgment may be used as weather information.

Next, the route search unit 42 has access through the data reading unit 48 to the statistical traffic data 320 having the mesh ID specified in S10303, which is stored in the map/statistical traffic data storage device 3. Then using the management data 322 of the statistical traffic data 320, the route search unit 42 obtains for each of candidate links a traffic information statistical value being one of the attention time zone and corresponding to the day type specified in S10301 and a weather type specified by the weather information obtained in S10303 (S10304).

Then the route search unit 42 finds for each of candidate links the cost (travel time) of the candidate link by the use of the traffic information statistical value obtained in S S10304 (S10305). In the case where the travel time is included in the traffic information statistical value, it is made the cost. In the case where a moving speed is included in place of the travel time, the route search unit 42 calculates the travel time of the link as the cost by using the moving speed and a link length specified by the link data 312. In addition, in the case where there is a candidate link for which a traffic information statistical value cannot be obtained in S10304, travel time included in the link data 312 of the candidate link, or travel time of the link calculated by the use of a moving speed and a link length included in the link data 312 is made the cost of the candidate link.

Next, the route search unit 42 calculates the total cost (total travel time needed until the termination node of the candidate link from the departure position) of each of candidate links. Concretely, the cost of the candidate link calculated in S10305 is added to the total cost of the extraction link registered in the heap table, and the result of addition is made the total cost of the candidate link. In the initial stage in which no extraction link is registered in the heap table, however, the cost of the candidate link calculated in S10305 is made the total cost of the candidate link. Then the route search unit 42 adds the link data and the total cost of each of candidate links to the heap table (S10306).

Next, the route search unit 42 investigates whether a link (referred to as a destination link) on which the destination is located or which closes to the destination is provided in links newly added to the heap table in S10306 which is performed just before (S10307).

When it is judged in S10307 that any destination link is not existent, the route search unit 42 extracts a non-extracted link having a minimum total cost from the heap table as by sorting information of links registered in the heap table in ascending order of total cost and extracting a non-extracted link disposed initially (S10308). Then the procedure returns to S10302.

In contrast, when it is judged in S10307 that a destination link is existent (Yes in S10307), the route search unit 42 performs the processing of deciding a recommended route.

Concretely, the route search unit 42 detects from the heap table a link which causes the destination link (a link whose termination node is the initiation node of the destination link), and decides the detected link as a link constituting a recommended route (referred to as a constituent link). Next, the route search unit 42 investigates whether the constituent link is a link on which the departure point is located or which closes to the departure point (referred to as a departure link). When the constituent link is not the departure link, the route search unit 42 detects a link which causes the constituent link and decides the detected link as a new constituent link, and further investigates whether the new constituent link is the departure link. The route search unit 42 repeats the processing until the constituent link is judged to be the departure link, and decides respective constituent links constituting the recommended route. Then the route search unit 42 stores in the route/present status traffic data storage unit 43, the link data 312 and the traffic information statistical values which are obtained in S10304, for the respective constituent links constituting the recommended route (S10309).

Through the Above Processing, Travel Time of respective constituent links constituting the recommended route becomes as follows. That is, travel time obtained from traffic information statistical values corresponding to a time zone including the departure point of time (the current time) are used as travel time of a first link constituting the recommended route. Also, travel time obtained from traffic information statistical values corresponding to a time zone including an expected point of time at the termination node of a (n−1)th extraction link connecting to the (n) th link is used as travel time of a (n) th (n≧2) link constituting the recommended route.

Figure 20:
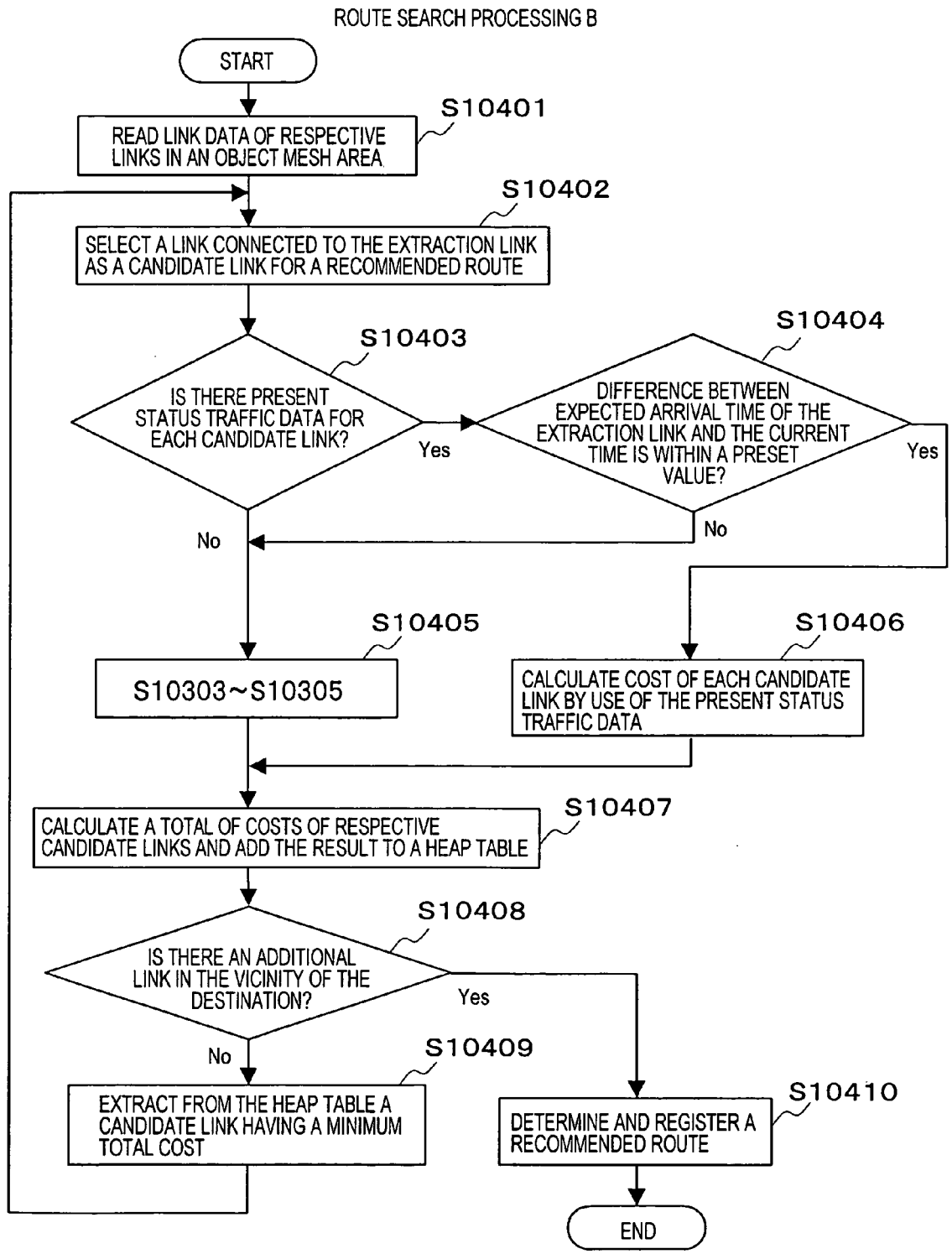
FIG. 20 is a flowchart illustrating a processing (route search processing B) in S104 shown in FIG. 18.

Next, the above route search processing B will be explained. FIG. 20 is a flowchart illustrating a processing (route search processing B) in S104 shown in FIG. 18.

First, the route search unit 42 obtains respective link data 312 in the respective mesh areas included in a region including the departure position and the destination in the same processing as that in S10301 shown in FIG. 19. Also, the route search unit 42 specifies a day type (departure day) (S10401).

Next, the route search unit 42 uses the respective link data 312 obtained in S10401 to select a link, in which a termination node of an extraction link extracted from a heap table in S10409 described later is made its initiation node, as a candidate link constituting a recommended route. In the case where the processing in S10409 is not performed, that is, in the initial stage in which no link is registered in the heap table, however, the route search unit 42 selects at least one link in which the departure position is existent, or which is close to the departure position as the candidate link instead of selecting a link, in which the termination node of the extraction link is made its initiation node, as the candidate link (S10402).

Next, the route search unit 42 investigates whether link travel time (or a link moving speed) in respective candidate links selected in S10402 is included in the present status traffic data stored in the route/present status traffic data storage unit 43 (S10403). In the case where the link travel time is included (Yes in S10403), the route search unit 42 calculates an expected arrival point of time at the termination node of the extraction link. Then the route search unit 42 further investigates whether a difference between the expected arrival point of time and the current time is within a predetermined value (S10404). Here, the predetermined value is preferably set to a period of time thought to be too small for a large change to come out in traffic situation, that is, a period of time (for example, 30 minutes) thought to be one during which there is no large change from the traffic situation indicated by present status traffic data even after the predetermined value has elapsed since the current time.

And in the case where link travel time (or a link moving speed) and the degree of link jam in respective candidate links selected in S10402 are not included in the present status traffic data stored in the route/present status traffic data storage unit 43 (No in S10403), or in the case where a difference between the expected arrival point of time at the termination node of the extraction link and the current time is not less than the predetermined value and it is judged that there is a high possibility that the traffic situation at the expected arrival point of time has changed much from the traffic situation indicated by the present status traffic data (No in S10404), the processing of the route search unit 42 proceeds to S10405 to perform the same processing as that in S10403 to S10405 shown in FIG. 19. Thereby, the route search unit 42 uses traffic information statistical values of the statistical traffic data to calculate cost for respective candidate links.

Meanwhile, in the case where link travel time (or a link moving speed) and the degree of link jam in respective candidate links selected in S10402 are included in the present status traffic data stored in the route/present status traffic data storage unit 43 (Yes in S10403), and in the case where a difference between the expected arrival point of time at the termination node of the extraction link and the current time is below the predetermined value and it is judged that there is a high possibility that the traffic situation at the expected arrival point of time has not changed much from the traffic situation indicated by the present status traffic data (Yes in S10404), the route search unit 42 obtains link travel time of respective candidate links from the present status traffic data stored in the route/present status traffic data storage unit 43. Alternatively, the route search unit 42 obtains link moving speeds for respective candidate links. Then the route search unit 42 uses link moving speeds for respective candidate links and link lengths included in the link data 312 of respective candidate links to calculate link travel time of respective candidate links to make the calculated link travel time of respective candidate links cost for respective candidate links (S10406).

Next, the route search unit 42 calculates a total cost (total travel time needed until the termination node of a candidate link from a departure position) of respective candidate links. Concretely, the route search unit 42 adds cost of candidate links calculated in S10405 or S10406 to total cost of extraction links registered in the heap table, and makes the result of addition total cost of the candidate links. In the initial stage in which no extraction link is registered in the heap table, however, the cost of the candidate link calculated in S10405 or S10406 is made the total cost of the candidate link. Then the route search unit 42 adds link data and total cost of respective candidate links to the heap table (S10407).

Next, the route search unit 42 investigates whether the destination link is present in links which are added to the heap table in S10407 performed just before (S10408).

In the case where the destination link is not present (No in S10408), the route search unit 42 sorts information of links registered in the heap table in ascending order of total cost and extracts a non-extraction link of the minimum total cost from the heap table by extracting a non-extraction link positioned at the top (S10409). Then the procedure returns to S10402.

Meanwhile, in the case where it is judged that a destination link is present (Yes in S10408), the route search unit 42 decides a recommended route in the same processing illustrated in the first embodiment and in S10309 shown in FIG. 19, and stores in the route/present status traffic data storage unit 43 the link data 312 and traffic information statistical values or present status traffic data for respective constituent links constituting a recommended route (S10410).

According to the processing above, the travel time of each of the constituent links constituting the recommended route is as follows. That is, travel time obtained from the present status traffic data is used as travel time of a first link constituting the recommended route. Also, as travel time of a (n) th link (n≧2) constituting the recommended route, travel time obtained from the present status traffic data is used in the case where the difference between the expected arrival point of time at the termination node of a (n−1)th link contiguous to the (n) th link and the current time is below a predetermined value, and travel time obtained from traffic information statistical values corresponding to a time zone including the expected arrival point of time is used in the case where the difference is not less than the predetermined value.

In addition, it does not matter in the flow shown in FIG. 20 whether the step of judgment in S10404 is modified in the following manner. That is, the route search unit 42 investigates whether the extraction link is present in a predetermined range from the destination (the current position). In the case where the extraction link is present, the route search unit 42 calculates the expected arrival point of time at the termination node of the extraction link to proceed to S10406 and in the case where the extraction link is not present, the process of the route search unit 42 proceeds to S10405. Here, the predetermined range suffices to be one up to a point where the traffic situation will not change much from the present situation, when the vehicle reaches there.

In this case, travel time of respective constituent links constituting the recommended route is as follows. That is, travel time obtained from the present status traffic data is used as travel time of constituent links located in the predetermined range from the destination (the current position). Also, travel time obtained from traffic information statistical values corresponding to a time zone including the expected arrival point of time is used as travel time of constituent links located outside the predetermined range from the destination (the current position).

The route search processing (route search processing A and route search processing B) has been explained in the above description. It is to be noted that the route search processing which can be applied to the present invention is not limited to the above embodiment. As far as the present invention can be implemented, other route search method may be employed. For example, it is possible to employ a route search method in which all the routes from a departure position to a destination included in an assumed mesh area are checked in round-robin manner according to the Dijkstra method, and then a route having the shortest travel time is searched out of all the routes.

(Processing for Obtaining Expected Travel Time and Expected Arrival Point of Time)

As to the process for obtaining the expected travel time and the like, it is schematically explained in the above described route search processing. That is, the route search unit 42 uses link data of the respective links constituting the recommended route, the traffic information statistical values or the present status traffic data stored in the route/present status traffic data storage unit 43, and calculates a cost of each link by the processes similar to those of S10305 in FIG. 19 and of S10406 in FIG. 20. Then, the summation of costs of the respective links constituting the recommended route is set as the expected travel time of the recommended route. Further, the time obtained by adding the expected travel time to the departure time (current time) is set as the expected arrival point of time at the destination.

(Processing for Obtaining the Reliability/Estimated Error)

Next, a processing for obtaining the reliability/estimated error as to the expected travel time and the expected arrival point of time will be explained.

The route search unit 42 calculates an error in costs of respective links constituting the recommended route by use of data spread included in the traffic information statistical values of respective links constituting the recommended routes registered in the route/present status traffic data storage unit 43. For example, in the case where the degree of dispersion is "small", the relative error corresponds to 3%, in the case where the degree of dispersion is "medium", the relative error corresponds to 5%, and in the case where the degree of dispersion is "large", the relative error corresponds to 10%. Then the route search unit 42 multiplies the cost of the link by the relative error corresponding to the degree of dispersion of the link to calculate an error of the link. The processing is performed on the respective links constituting the recommended route. In addition, for links in which the present status traffic data is registered instead of the traffic information statistical values, the route search unit 42 multiplies the cost of the link by a predetermined relative error to calculate an error of the link. Here, it suffices that the predetermined relative error be made smaller (for example, 1%) than relative errors of links in which traffic information statistical values are registered. On the other hand, for links in which neither the traffic information statistical values nor the present status traffic data are registered, the route search unit 42 multiplies the cost of the link by a predetermined relative error to calculate an error of the link. Here, it suffices that the predetermined relative error be made larger (for example, 15%) than relative errors of links in which traffic information statistical values are registered. Next, the route search unit 42 calculates the total amount of errors of the respective links in cost and the total amount of errors is made estimated errors in the expected travel time and the expected arrival point of time. Further, the route search unit 42 calculates a rate (relative error) of an estimated error to the expected travel time and decides the reliability of the expected travel time and the expected arrival point of time according to the value of the rate. For example, when the rate is less than 5%, the reliability is determined to be "high", when the rate is not less than 5% and less than 10%, the reliability is determined to be "medium", and when the rate is 10% or more, the reliability is determined to be "low". The reliability calculated in this manner, as shown in 807 of FIG. 16, is used for display.

(Processing for Obtaining the Jam Level)

Next, a process for obtaining the jam level will be explained.

The route search unit 42 decides jam level displaying sections of the recommended route and jam levels of the respective displaying sections. In the present embodiment, the recommended route is divided into a plurality of sections (jam level displaying sections), and jam levels can be displayed in unit of section on the display 2, as shown in 804 of FIG. 16.

The processing of calculating the jam level is performed, for example, in the following manner. That is, the route search unit 42 refers to the degree of jam included in the traffic information statistical values of the respective links constituting the recommended route, and when adjacent links are in the same jam level, the route search unit 42 allots the both links to the same jam level displaying section. Then the route search unit 42 sets the sections to the same jam level.

Alternatively, the route search unit 42 refers to the moving speeds included in the traffic information statistical values of the respective links constituting the recommended route, or an average value of the moving speeds obtained from the travel time and the link lengths included in the link data, and when the average of the moving speeds of adjacent links belongs to the same moving speed zone out of plural moving speed zones as preset and road type and limit speeds included in the link data of the respective adjacent links are the same, the route search unit 42 allots the respective adjacent links to the same jam level displaying section. Then the route search unit 42 sets the section to a jam level according to a combination of the moving speed zone and the road type and a ratio of the moving speed zone and the limit speeds.

Alternatively, the route search unit 42 divides the recommended route every plural links and sets respective sections obtained as a result to jam level displaying sections. Then for the respective jam level displaying sections, the route search unit 42 calculates an average value of moving speeds included in the traffic information statistical values of respective plural links included in the section, or an average value of moving speeds obtained from an average value of travel time and the total amount of link lengths included in the link data of the plural links. Further, the route search unit 42 calculates an average value of limit speeds included in the link data of the plural links. Then, for the respective jam level displaying sections, the route search unit 42 sets jam level of the section to a jam level corresponding to a ratio of the average value of moving speeds and the limit speeds.

For links having no traffic information statistical value, the corresponding sections are dealt with as jam level displaying sections being unclear in jam level.

The jam level set in this manner, as shown in 804 of FIG. 16, is displayed in proportion to a length of the section.

(Route Guidance Operation)

Figure 21:
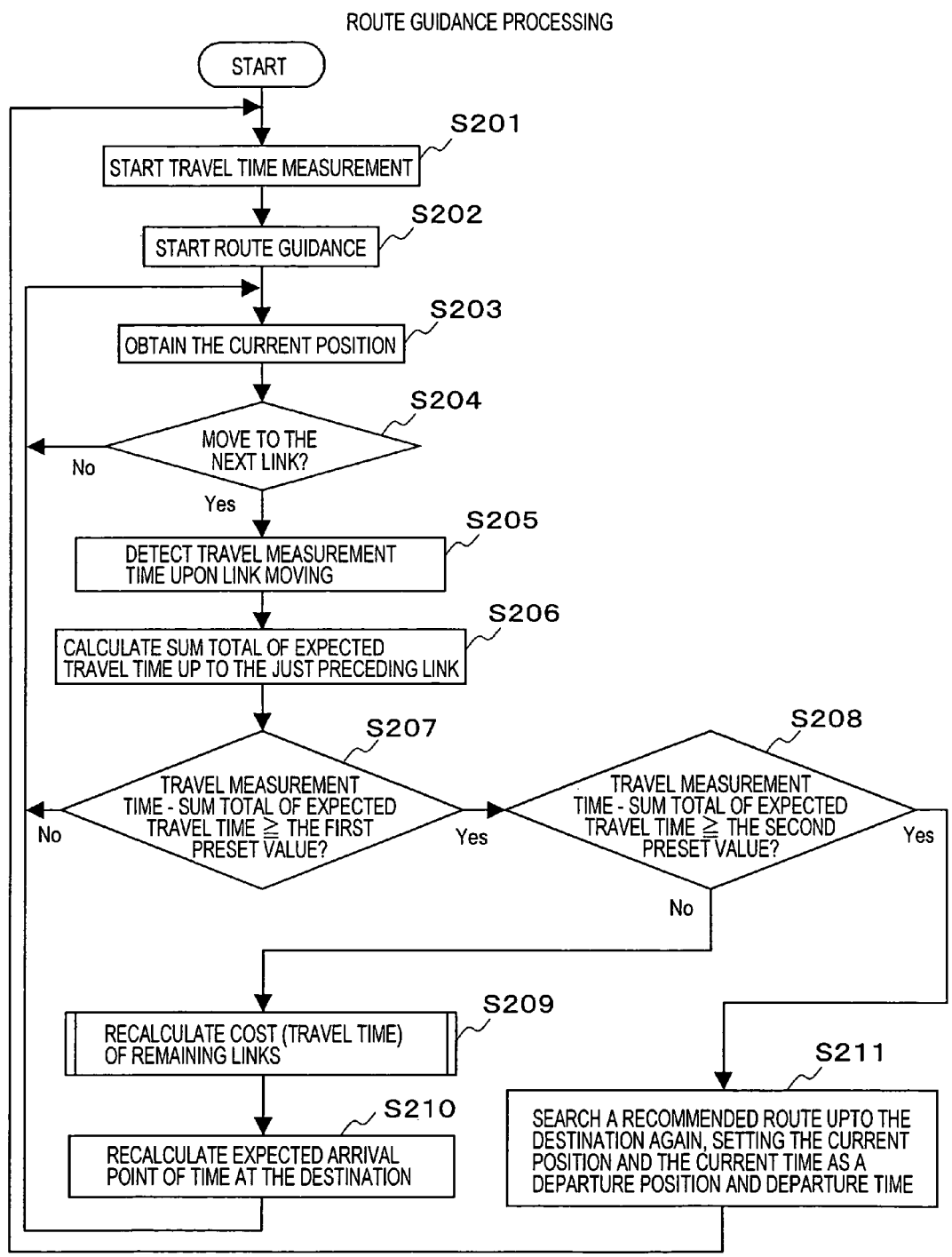
FIG. 21 is a flowchart for explaining a recommended route guidance operation.

Next, a recommended route guidance operation of the in-vehicle type navigation device 1000 of the present embodiment will be explained. FIG. 21 is a flowchart showing a recommended route guidance operation of the in-vehicle type navigation device 1000 to which the present embodiment has been applied. The flow is started when the user operation analyzer 41 receives a route guidance request for a recommended route displayed on the display 2, from the user through the voice input/output device 4 or the input device 5.

First, the user operation analyzer 41 informs the route guidance unit 44 of the route guidance request received from the user. Receiving the request, the route guidance unit 44 uses a built-in timer (not shown) to begin measurement of travel time (S201). Further, the route guidance unit 44 begins the route guidance with the common (existing) technique of route guidance by the use of the information of a recommended route stored in the route/present status traffic data storage unit 43, and the map data stored in the map/statistical traffic data storage device 3 (S202).

When the current position is newly outputted from the map matching processor 47 in the processing of route guidance (S203), the route guidance unit 44 judges whether the current position has been moved to a next link from a certain link (referred to as a just preceding link), these links constituting the recommended route as the object of route guidance (S204). In the case where the current position has not been moved (No in S204), the procedure returns to S203 to wait for new outputting of the current position from the map matching processor 47. Meanwhile, in the case where the current position has been moved (Yes in S204), the route guidance unit 44 detects travel time at that time and makes the travel time an actual measurement of travel time until the just preceding link (S205). Further, the route guidance unit 44 calculates a sum total of costs of the respective links (link travel time) from the first link to the just preceding link, out of respective links constituting the recommended route as the object of route guidance, on the basis of information (traffic information statistical values or present status traffic data) of the recommended route stored in the route/present status traffic data storage unit 43 (S206).

Thereafter, the route guidance unit 44 calculate a difference between the actual measurement of travel time until the just preceding link detected in S205 and the sum total of costs of the respective links until the just preceding link obtained from the information of the recommended route stored in the route/present status traffic data storage unit 43 in S206, and compares the difference with first and second predetermined values (S207, S208).

Here, the second predetermined value is one which judges the necessity of searching a new recommended route extending to the destination again, and is set to, for example, (A/B)×C where A denotes the sum total of costs of respective links until the just preceding link, B denotes the sum total of costs of respective links constituting the recommended route, and C denotes an estimated error of expected travel time until the destination. Also, the first predetermined value is one which judges the necessity of calculating a new expected arrival point of time at the destination again, and is set to a smaller value than the second predetermined value, for example, around ⅓ of the second predetermined value.

As described above, the present embodiment uses, as costs of the links constituting the recommended route, the link travel time of the link represented by the present status traffic data, or the link travel time of the link represented by the traffic information statistical values in a time zone including an expected arrival point of time at the initiation node of the link (see S10305 shown in FIG. 19, S10406 shown in FIG. 20, etc.). Accordingly, when a difference between an actual measurement of travel time until the just preceding link and the sum total of costs (link travel times) of respective links until the just preceding link becomes large, it is required that traffic information statistical values are reconsidered, which are used for deciding respective link costs, for the links subsequent to the just preceding link, constituting the recommended route. It is further possible to make a modification such that an accuracy of the expected arrival point of time is enhanced, by use of the latest present status traffic data for the mesh area of the periphery of the current position. Hereupon, the difference is compared with the first and second predetermined values in S207 and S208 in the present embodiment.

And when the difference is smaller than the first predetermined value (No in S207), the procedure returns to S203 and the route guidance unit 44 waits until a current position is newly outputted from the map matching processor 47.

Further, when the difference is not less than the first predetermined value and smaller than the second predetermined value (Yes in S207 and No in S208), the route guidance unit 44 recalculates costs of the remaining links (respective links between a link subsequent to the just preceding link and the last link (destination link)). This recalculation is referred to as a remaining link cost recalculation processing (S209). Then, by use of each cost of the remaining links, which is recalculated, the expected arrival point of time at the destination is recalculated, and the result thereof is outputted from the display 2 or the voice input/output device 4, so as to inform the user of the expected arrival point of time (S210).

Here, the expected arrival point of time at the destination can be calculated by adding to the current time total travel time obtained from new costs of the respective remaining links. Thereafter, the procedure of the route guidance unit 44 returns to S203 to wait until a current position is newly outputted from the map matching processor 47.

Meanwhile, when the difference is not less than the second predetermined value (Yes in both S207 and S208), the route guidance unit 44 sets the departure position, the departure point of time, and the destination in the route search unit 42 with a current position and the current time as the departure position and the departure point of time. And the route guidance unit 44 allows the route search unit 42 to perform the recommended route search processing (see FIG. 18) (S211). As a result, if the route is changed, the user is informed of the change via the display 2 or the voice input/output device. Then, when a new recommended route is stored in the route/present status traffic data storage unit 43, the procedure returns to S201. The flow is terminated when the current position reaches the destination.

Figure 22:
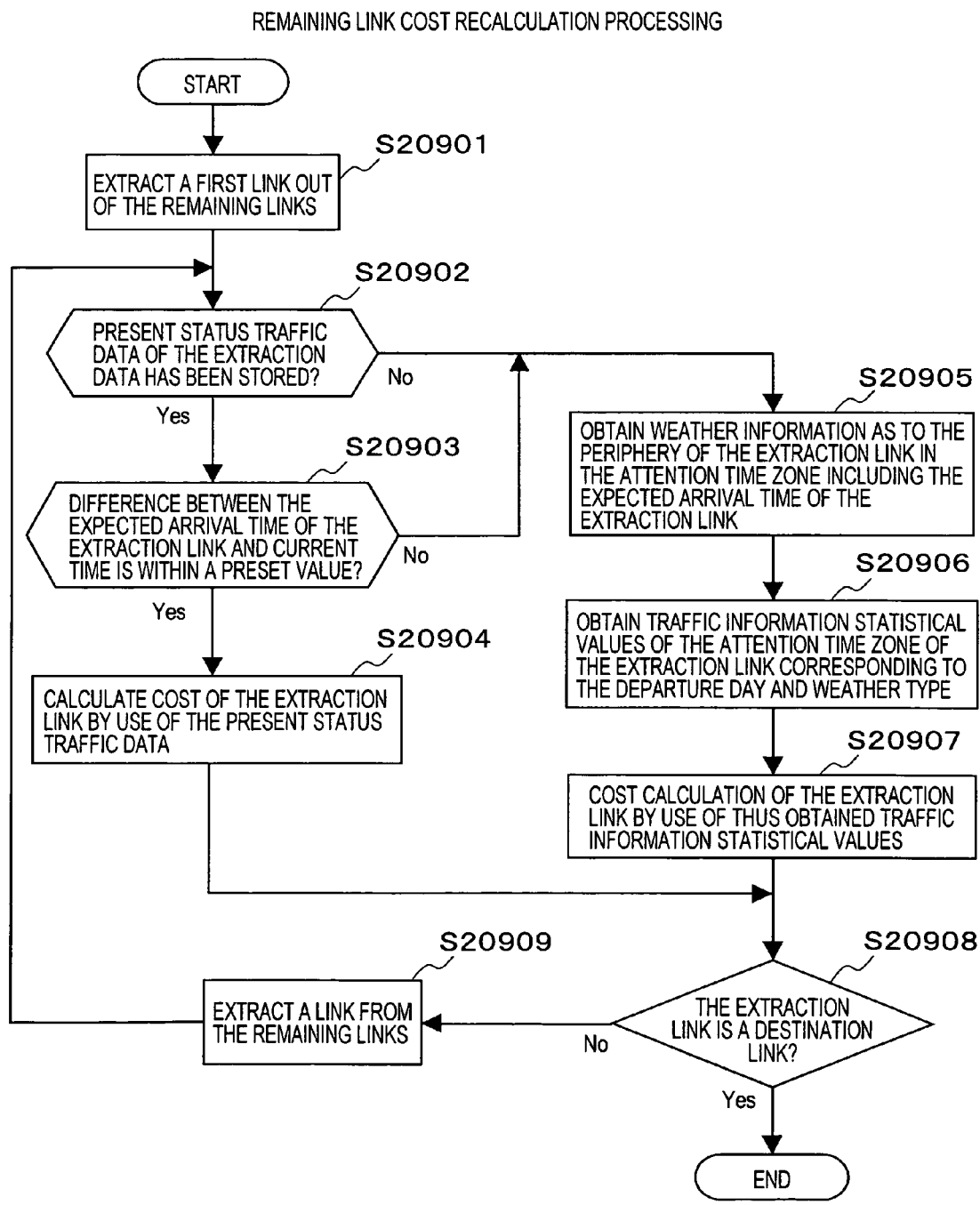
FIG. 22 is a flowchart illustrating a process in S209 shown in FIG. 21 (a remaining cost recalculation processing).

Next, the cost recalculation processing of the remaining link costs will be described. FIG. 22 is a flowchart illustrating a process in S209 shown in FIG. 21 (a cost recalculation processing of remaining links).

First, the route guidance unit 44 extracts information of a first remaining link (a link in which the current position is located) out of information of respective links constituting the recommended route stored in the route/present status traffic data storage unit 43 (S20901).

Subsequently, the route guidance unit 44 reads out cost of respective links (link travel time) between a link in which the current position is located and a link just preceding a link extracted in S20901 or S20909 described later (referred to as an extraction link), out of the links constituting the recommended route, from the route/present status traffic data storage unit 43 and adds total cost of the respective links to the current time to calculate the expected arrival point of time at the initiation node of the extraction link. Then the route guidance unit 44 investigates whether present status traffic data of the mesh area including the extraction link have been stored in the route/present status traffic data storage unit 43 (S20902).

In S20902, in the case where present status traffic data of the mesh area including the extraction link have been stored in the route/present status traffic data storage unit 43, the route guidance unit 44 makes a comparison between the expected arrival point of time of the extraction link calculated in S20902 and the current time, and investigates whether a time difference between the both is below a predetermined value (S20903).

Here, the predetermined value is set to a period of time thought to be too small for a large change to come out in traffic situation, that is, a period of time (for example, 30 minutes) thought to be one during which there is no large change from the traffic situation indicated by the present status traffic data having been obtained even after the predetermined value has elapsed since the current time, in the same manner in S10404 shown in FIG. 20. In addition, in the case where the extraction link is one (a link in which the current position is located) extracted in S20901, the current time is made the expected arrival point of time.

In S20903, in the case where a difference between the expected arrival point of time at the initiation node of the extraction link and the current time is below the predetermined value, the route guidance unit 44 sets link travel time of the extraction link specified by the present status traffic data stored in the route/present status traffic data storage unit 43, or link travel time obtained from a link moving speed and a link length to the cost of the extraction link (S20904). Thereafter, the processing of the route guidance unit 44 proceeds to S20908.

Meanwhile, in S20902, in the case where present status traffic data of the mesh area including the extraction link is not stored in the route/present status traffic data storage unit 43, or the difference between the expected arrival point of time at the initiation node of the extraction link and the current time is not less than the predetermined value in S20903, the route guidance unit 44 uses the first conversion table to specify the mesh ID of the mesh area in which the initiation node of the extraction link is located. And the route guidance unit 44 obtains weather information having the specified mesh ID and a time zone (referred to as attention time zone) to which the expected arrival point of time at the initiation node of the extraction link belongs, from the FM multiplexing broadcasting station 5000 through the FM multiplexing broadcasting receiver 12 (S20905). The route guidance unit 44 may judge weather on the basis of status information of the operation of a wiper and outside air temperature information received through the in-vehicle LAN device 11, and make use of the result of judgment as weather information.

Subsequently, the route guidance unit 44 accesses through the data reading unit 48 to the map/statistical traffic data storage device 3 and uses the management data 322 of the statistical traffic data 320 having the specified mesh ID to obtain that traffic information statistical value of the attention time zone which corresponds to a weather type specified by the weather information obtained in S20905 and a day type specified in S10301 in FIG. 19 or S10401 in FIG. 20, for the extraction link (S20906). Then the route guidance unit 44 uses the obtained traffic information statistical value to calculate cost of the extraction link in the same processing illustrated in S10305 shown in FIG. 19 (S20907). Thereafter, the processing of the route guidance unit 44 proceeds to S20908.

In S20908, the route guidance unit 44 investigates whether the extraction link is the destination link. In the case where the extraction link is not the destination link (No in S20908), the route guidance unit 44 extracts information of a remaining link subsequent to the extraction link out of information of respective links constituting the recommended route stored in the route/present status traffic data storage unit 43 (S20909). Then the procedure returns to S20902. Meanwhile, in the case where the extraction link is the destination link (Yes in S20908) the route guidance unit 44 terminates the processing.

As a result of the above, travel time (cost) of respective remaining links is as follows. That is, travel time obtained from the present status traffic data is used as travel time of a first remaining link. Also, as travel time of a (m)th link ($m \geq 2$), travel time obtained from the present status traffic data is used in the case where the difference between the expected arrival point of time at the initiation node of the (m)th remaining link and the current time is below a predetermined value, and travel time obtained from a traffic information statistical value corresponding to a time zone including the expected arrival point of time is used in the case where the difference is not less than the predetermined value.

In addition, it does not matter in the flow shown in FIG. 22 that the step of judgment in S20903 is modified in the following manner. More specifically, the route guidance unit 44 investigates whether the extraction link is present in a predetermined range from the current position, and the processing of the route guidance unit 44 proceeds to S20904 in the case where the extraction link is present, and proceeds to S20905 in the case where the extraction link is not present. Here, the predetermined range suffices to be an expected range up to a point where the traffic situation will not change much from the present situation, when the vehicle reaches there.

In this case, travel time of respective constituent links constituting the recommended route is as follows. That is, travel time obtained from the present status traffic data is used as travel time of constituent links remaining in the predetermined range from the current position. Also, travel time obtained from traffic information statistical values corresponding to a time zone including the expected arrival point of time is used as travel time of remaining links located outside the predetermined range from the current position.

Figure 23:
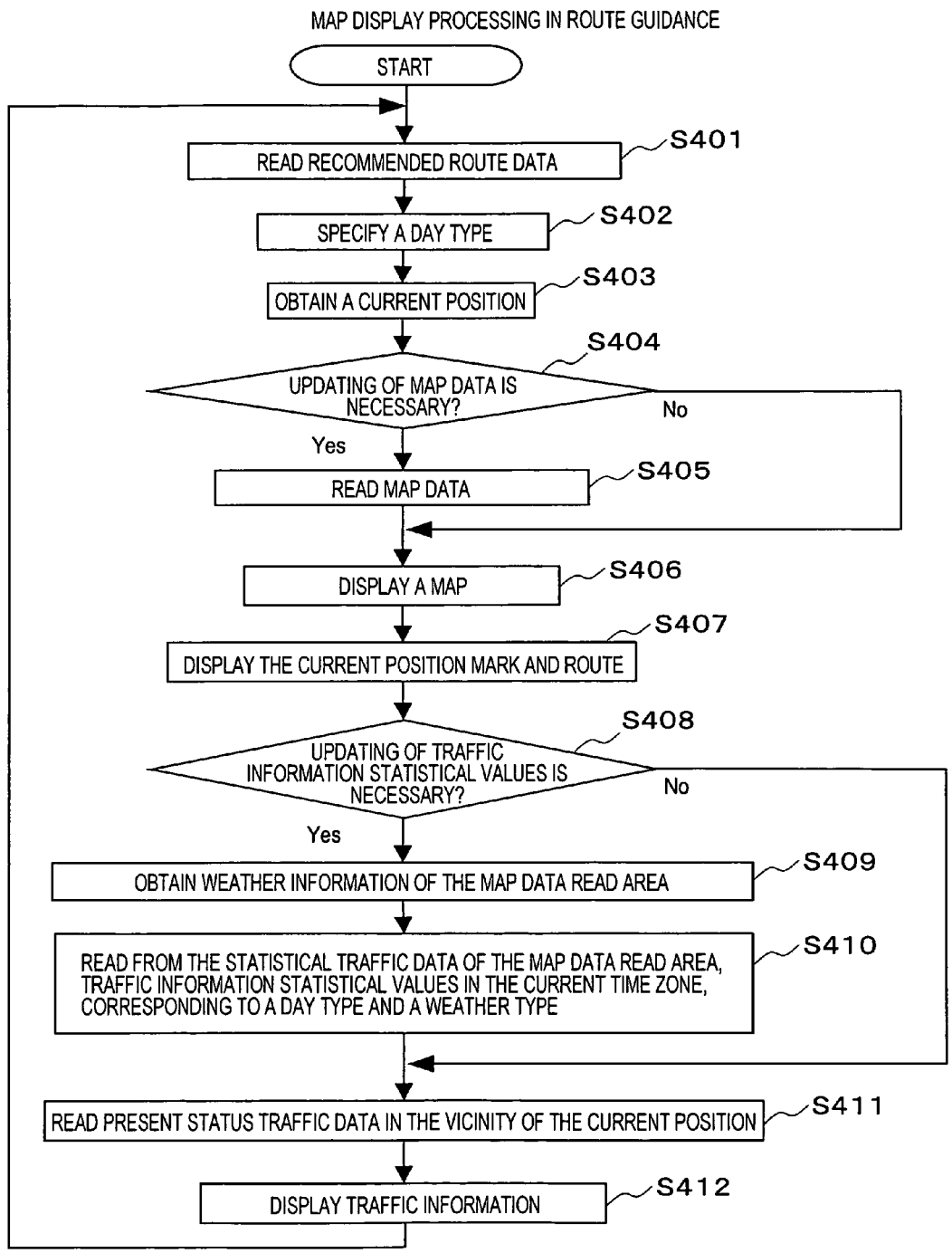
FIG. 23 is a flowchart illustrating a map display operation in route guidance.

Subsequently, the map display operation in route guidance will be described. FIG. 23 is a flowchart illustrating the map display operation in the route guidance.

First, the route guidance unit 44 reads out link data of respective links constituting the recommended route from the route/present status traffic data storage unit 43. And the route guidance unit 44 delivers map data to the map display processor 45 (S401). Then the route guidance unit 44 uses the second conversion table to specify a day type (departure day) (S402).

Next, when the route guidance unit 44 obtains the current position from the map matching processor 47 (S403), it judges whether there is a need of newly reading out map data from the map/statistical traffic data storage device 3 in order to display a map of the periphery of the current position on the display 2 (S404), and reads out map data of the periphery (however, larger than the vicinity of the current position in S411 described later) of the current position from the map/statistical traffic data storage device 3 through the data reading unit 48. And the route guidance unit 44 delivers map data to the map display processor 45 (S405).

The map display processor 45 creates the map of the periphery of the current position calculated by the map matching processor 47 on the basis of the map data received from the route guidance unit 44, and displays the map on the display 2 through the graphics processor 51 (S406). Also, the map display processor 45 creates a current position mark and a recommended route mark on the basis of the current position calculated by the map matching processor 47 and the data of respective links received from the route guidance unit 44, and displays the marks as well as the map on the display 2 through the graphics processor 51 (S407).

Subsequently, the route guidance unit 44 judges whether there is a need of update with respect to the traffic information statistical value as read (S408). For example, in the case where a predetermined period of time (a period of time corresponding to, for example, the unit time zone in the table 3224 shown in FIG. 4) has elapsed since traffic information statistical values were read out at the last time, the route guidance unit 44 judges that there is a need of updating the traffic information statistical values. And when it is judged that there is the need, the route guidance unit 44 uses the first conversion table to specify mesh IDs of respective mesh areas corresponding to a region indicated in the map data read out from the map/statistical traffic data storage device 3 in S405. Further, the route guidance unit 44 obtains weather information which has the specified mesh ID and to which the current time belongs, from the FM multiplexing broadcasting station 5000 through the FM multiplexing broadcasting receiver 12. Alternatively, the route guidance unit 44 judges weather from the state of the operation of a wiper and outside air temperature information received through the in-vehicle LAN device 11 (S409). Then the route guidance unit 44 reads out the statistical traffic data having the specified mesh ID and being traffic information statistical values of respective links of a time zone to which the current time belongs, the values corresponding to the day type specified in S402 and the weather type obtained or judged in S409, from the map/statistical traffic data storage device 3 through the data reading unit 48 (S410). Further, when present status traffic data of the periphery of the current position is stored in the route/present status traffic data storage unit 43, the route guidance unit 44 reads out the data (S411).

Then, for respective links included in the map of the periphery of the current position, the route guidance unit 44 delivers to the map display processor 45 link traffic information (jam level, link travel time, or the like) represented by status traffic data when the status traffic data are read out, and traffic information statistical values (jam level, link travel time, or the like) when the status traffic data are not read out.

In response thereto, the map display processor 45 displays the traffic information or the traffic information statistical values received from the route guidance unit 44 and relates them to corresponding links on the map to display the same on the display 2 through the graphics processor 51 (S412). At this time, the traffic information (status traffic data) and the traffic information statistical values (statistical traffic data) are displayed in an identifiable manner.

Figure 24:
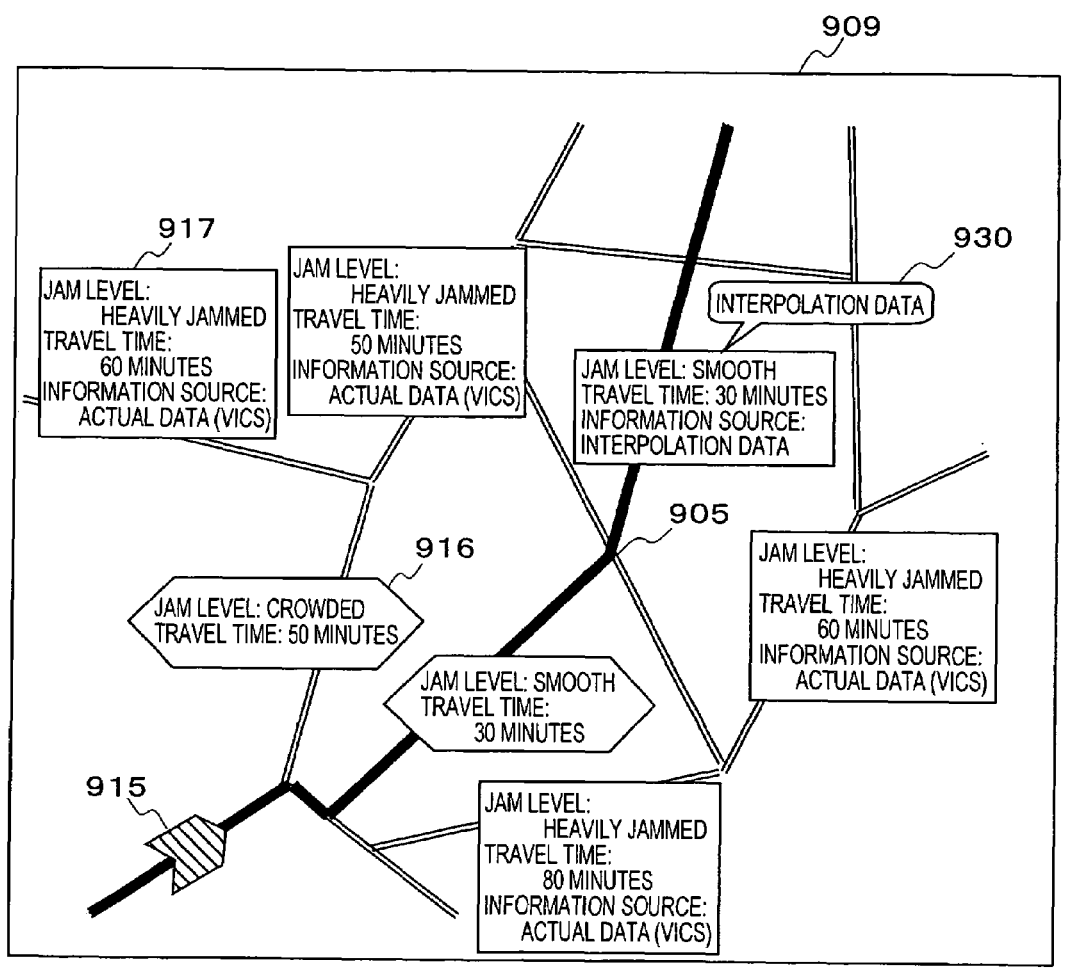
FIG. 24 is a view showing an example of map display of the map display operation in the route guidance shown in FIG. 23.

FIG. 24 shows an example of the map display in route guidance. In this example, a recommended route 905 and a current position mark 915 are displayed on a map 909. Further, traffic information (present status traffic data) 916 and traffic information statistical values (statistical traffic data) 917 are displayed on respective roads of the map 909. The traffic information 916 and the traffic information statistical values 917 are displayed to be different in color and shape (frame) from each other so that the both can be identified.

It is further possible to display in such a manner as identifiable whether or not the levels of the jam degree and the like are obtained from interpolation data. In FIG. 24, the mark 930 indicates that the jam level is obtained from the interpolation data. Alternatively, it is also possible to display with a variation in colors or shapes (frames) between the actual data and the interpolation data, so that it is identifiable whether it is based on the interpolation data or not. Moreover, it is also possible not to display the jam level and the like in the case where the information is obtained from the interpolation data.

The route guidance operation of the in-vehicle type navigation device 1000 of the present embodiment has been explained in the above description.

(Switching of Displays Between Statistical Traffic Information and Present Status Traffic Information)

The in-vehicle type navigation device 1000 of the present embodiment features that displays of the statistical traffic information and the present status traffic information are switched in response to a specific operation from a user. It also features that if an operation other than the statistical traffic information displaying operation is performed, during the time when the statistical traffic information is displayed, the display is switched to the present status traffic information display.

In the present embodiment, usually, the present status traffic information is mainly displayed on the display 2. However, at the time of the route search or the expected travel time calculation, there may be a case that only the statistical traffic information is displayed. In such a case, the user may want to display the present traffic information (or display a mixture of the present status information and the statistical traffic information), so as to know the current situation. Then, in the present embodiment, switching between the statistical traffic information display and the present traffic information display is made easily. Further, if there is an operation other than the operation to maintain the statistical traffic information display (an operation which prefers the present status traffic information display), the present status traffic information is displayed.

Figure 25:
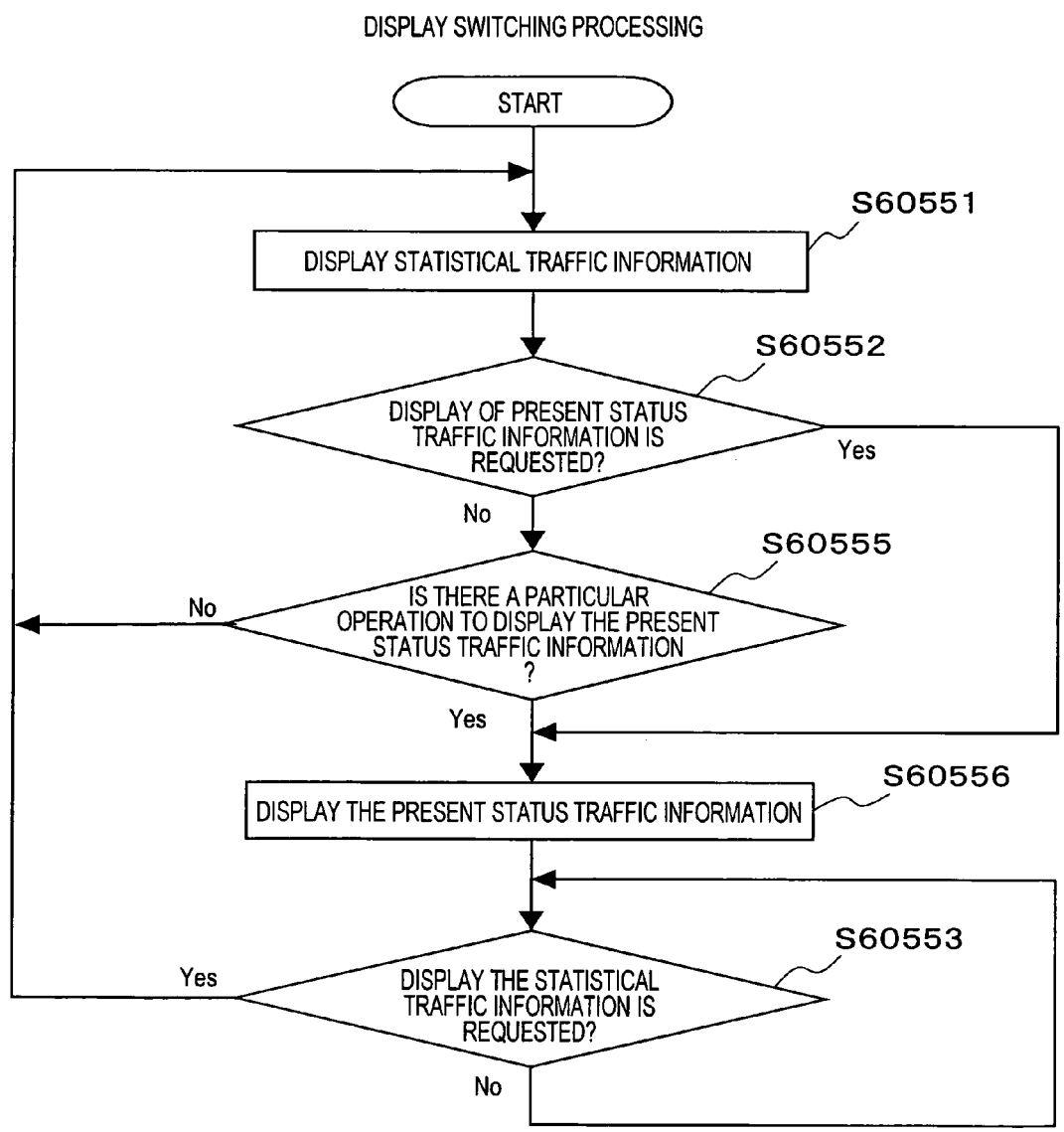
FIG. 25 is a flowchart for explaining a switching process between the display of the statistical traffic information and the display of the present status traffic information.

FIG. 25 is a flowchart showing a flow of processing to perform switching between the present status traffic information display and the statistical traffic information display, in response to a particular operation by the user.

Figure 26:
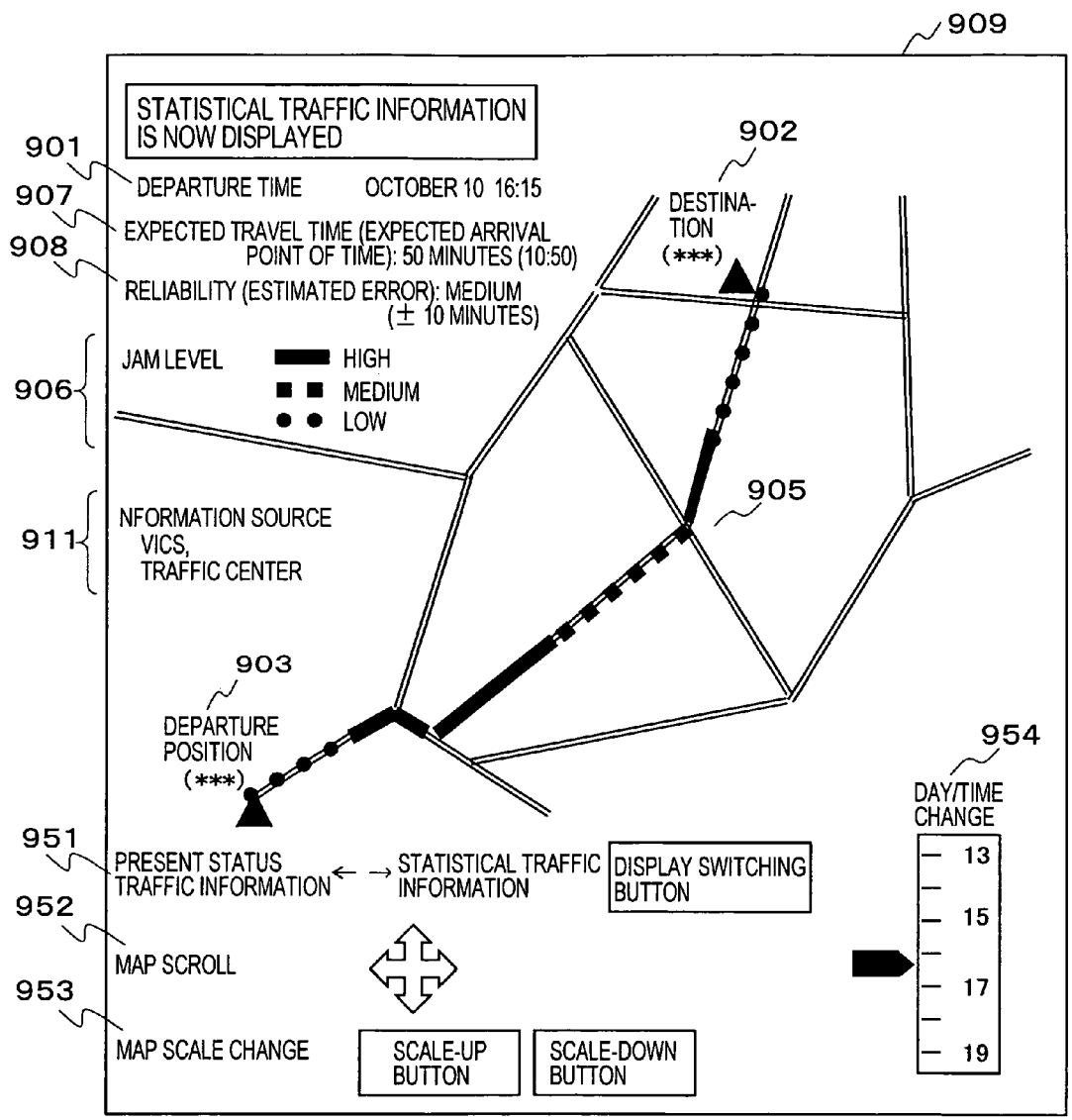
FIG. 26 shows an example of display of the statistical traffic information in S601 shown in FIG. 25.

As shown in FIG. 26, if the user operation analyzer 41 receives the request for displaying the present status traffic information during the time when the statistical traffic information is displayed (Yes in S60552) the user operation analyzer 41 instructs the menu display processor 50 to switch the display to the present status traffic information display. Even when there is no request for displaying the present status traffic information directly by the user (No in S60552), the display is switched to the present status traffic information display, if there is a particular operation which prefers to display the present status traffic information (Yes in S60555).

Here, the particular operation which prefers to display the present status traffic information will be explained. That is, it is an operation other than the operation which prefers to maintain displaying the statistical traffic information without a change. For example, it is an operation such as a guidance start button operation and a menu button operation, other than a map manipulation. In other words, when the menu button is pressed, displaying operation is conducted with a determination that displaying the statistical traffic information in overlaying manner on the map is terminated.

The operation which prefers to maintain a display of the statistical traffic information is an operation of the button relating to the map manipulation. That includes the operations for map scrolling 952, map scaling 953, the buttons being able to be pressed on the display screen, and the like. If any of the operations above is conducted while the statistical traffic information is displayed, it is perceivable that the user wants to see the display regarding statistical traffic information continuously. Therefore, it is not necessary to switch the display to the present status traffic information display.

On the other hand, the operation other than the operation which prefers to maintain displaying the statistical traffic information without a change is conducted it is perceivable that the user wants to see the display regarding the present status traffic information. Therefore, if a menu button operation and the like are conducted, it is determined that a particular operation preferring to display the present status traffic information has been conducted, and the display is switched to the present status traffic information display.

In the case where the present status traffic information is displayed (S60556), when the user operation analyzer 41 receives a request of displaying the statistical traffic information (Yes in S60553), the user operation analyzer instructs the menu display processor 50 to display the present status traffic information (S60551).

According to the flow as described above, it is easy to perform switching between the statistical traffic information display and the present status traffic information display. If a user conducts an operation other than the operation which prefers to maintain displaying the statistical traffic information (an operation preferring to display the present status traffic information), the display can be switched automatically to the present status traffic information display.

One embodiment of the present invention has been explained in the above description.

According to the present embodiment, with the configuration as described above, it is possible to conduct a route search, expected travel time calculation and the like as to a plurality of departure time candidates including the current time and a point of time beyond the current time, by use of the statistical traffic information.

Since the search result, the travel time calculation result, the degree of jam and the like are comparatively displayed with respect to each departure time candidate it is possible for a user to easily select a travel plan convenient to the user.

Further, the statistical traffic information is stored along with the information indicating whether the data is actual data or interpolation data, these data items can be distinctively displayed. Accordingly, the user can judge accuracy of the information by oneself.

It is also easy to use since the statistical traffic information display and the present status traffic information display can be easily switched. Furthermore, even if it is not directly instructed to display the present status traffic information, the display can be automatically switched, in the case where a particular operation preferring to display the present status traffic information is conducted. Therefore, it is possible to provide an in-vehicle type navigation device which is convenient to use.

It should be understood that the present invention is not limited to the above embodiments, and it may be modified variously within the scope of the invention. For example, in the present embodiment, a search condition used for determining the traffic information statistical values which are used in cost calculation is not limited to a combination of a day type and a weather type. Either one of the day type and the weather type may be separately used as the search condition. Alternatively, it is also possible to manage the traffic information statistical values by combining another condition in addition to the day type and the weather type.

Further in the above embodiment, schematic present status traffic data and the weather information is obtained by use of FM multiplexing broadcasting signals. However, the present invention is not limited to this. A method other than the FM multiplexing broadcasting, such as a digitalized terrestrial broadcasting and satellite digital broadcasting, may be used to obtain the schematic present status traffic data or the weather information.

The above embodiments have been described with respect to application of the invention to an in-vehicle type navigation device the invention is applicable to navigation devices except the in-vehicle type one.

As described above, according to the present invention, it is possible to search a recommended route and calculate an expected travel time, by use of the traffic information collected in the past and the present status traffic information as to a plurality of departure points of time.

What is claimed is:

1. A travel time calculating method of a navigation device, wherein, said navigation device comprises a storage device which stores map data including link data of respective links constituting roads on a map, and statistical data including a travel time or a moving speed, which are determined by statistical values of traffic information collected in the past, wherein, said statistical data is classified by a collection condition of the traffic information, which is a basis for determining said statistical data, and the navigation device is allowed to execute the following:

a departure position/destination setting step which sets a departure position and a destination, a departure time candidate setting step which sets a plurality of departure time candidates, and a travel time calculating step which uses, with respect to each of said departure time candidates, said map data and said statistical data of the collecting conditions corresponding to statuses in passing through respective route constituting links, each constituting a route between said departure position and said destination, obtains travel times for said respective route constituting links, and further obtains a travel time between said departure position and said destination by summing up thus obtained travel times of respective route constituting links, wherein said statistical data includes a travel time or a moving speed by time zone for each of said links, said travel time calculating step calculates said travel time, by using, as the travel time of a first link constituting a route between said departure position and said destination, a travel time corresponding to a time zone including a departure time of said departure position included in said statistical data, or a travel time obtained from the moving speed corresponding to the time zone, and as the travel time of the (n)th route constituting link (n≧2) constituting the route between said departure position and said destination, a travel time corresponding to a time zone including an expected arrival point of time at a termination node of (n−1)th route constituting link, being connected to the (n) th route constituting link, or a travel time obtained from a moving speed corresponding to the time zone.

2. A travel time calculating method of a navigation device according to claim 1, wherein, said navigation device further executes a route specifying step which specifies a route between said departure position and said destination, and said travel time calculating step obtains, with respect to each of said departure time candidates, a travel time of the route specified in said route specifying step.

3. A travel time calculating method of a navigation device according to claim 1, wherein, said navigation device further executes a route searching step which searches for a route between said departure position and said destination, and said travel time calculating step obtains, with respect to each of said departure time candidates, a travel time of the route searched in said route searching step.

4. A travel time calculating method of a navigation device according to claim 1, wherein, said travel time calculating step obtains, with respect to each of said departure time candidates, a travel time for a route which has the shortest travel time between said departure position and said destination, which is searched by use of said map data and said statistical data.

5. A travel time calculating method of a navigation device according to claim 1, wherein, said navigation device further executes a displaying step, which displays with respect to each of said departure time candidates, the travel time obtained in said travel time calculating step.

6. A travel time calculating method of a navigation device according to claim 5, wherein, said statistical data includes a degree of jam by time zone for each of said links, said travel time calculating step uses the travel times of said respective links constituting the travel route or the degree of jam in the time zone corresponding to the moving speed, and determines the degree of jam of each of sections in a case where the travel route is divided into a plurality of sections, and said travel time displaying step displays the travel time and the degree of jam in each of the sections of the travel route obtained in said travel time calculating step, in a length according to the travel time of the section, and in a display mode in accordance with the degree of jam of the section, in a form of bar graph.

7. A travel time calculating method of a navigation device according to claim 1, wherein, said departure time candidate setting step includes a step which receives a selection whether the departure time candidate is set to the current time, or to the time beyond the current time.

8. A travel time calculating method of a navigation device according to claim 1, wherein, information for deciding whether the travel time or the moving speed of each of said links, is generated from actual measurement data or is generated from an interpolation processing on the actual measurement data, and when information regarding the travel time or the moving speed of each of said links is displayed based on said statistical data, a display mode is differentiated between the case where the travel time or the moving speed of each of said links is generated from actual measurement data, and the case where the travel time or the moving speed of each of said links is generated from the interpolation processing on the actual measurement data.

9. A traffic information displaying method of a navigation device according to claim 8, wherein, the information regarding the travel time or the moving speed of each of said links, being generated by the interpolation processing, is not displayed.

10. A travel time calculating method of a navigation device according to claim 1, wherein, said navigation device executes:

a step which obtains present status traffic information of each of said links present in the periphery of a current position detected by said current position detecting function, a step which receives a selection of a display mode, either of a mode for displaying information based on said statistical data and a mode for displaying information based on said present status traffic information, and a step which displays in the display mode thus selected.

11. A traffic information displaying method according to claim 10, further executes, a step which switches the display mode to display the information based on the present status traffic data, when an operation other than an operation to maintain displaying said information based on the statistical data is conducted, while said information based on the statistical data is displayed.

12. A navigation device comprising a storing means which stores map data including link data of respective links constituting roads on a map, and statistical data including a travel time or a moving speed, which are determined by statistical values of the traffic information collected in the past, wherein, said statistical data is classified by a collection condition of traffic information, which is a basis for determining said statistical data, and the navigation device includes:

a departure position/destination setting means which sets a departure position and a destination, a departure time candidate setting means which sets a plurality of departure time candidates, and a travel time calculating means which uses, with respect to each of said departure time candidates, said map data and said statistical data of the collecting conditions corresponding to statuses in passing through respective route constituting links, each constituting a route between said departure position and said destination, obtains travel times for said respective route constituting links, and further obtains a travel time between said departure position and said destination by summing up thus obtained travel times of respective route constituting links, wherein said statistical data includes a travel time or a moving speed by time zone for each of said links, said travel time calculating step calculates said travel time, by using, as the travel time of a first link constituting a route between said departure position and said destination, a travel time corresponding to a time zone including a departure time of said departure position included in said statistical data, or a travel time obtained from the moving speed corresponding to the time zone, and as the travel time of the (n) th route constituting link (n≧2) constituting the route between said departure position and said destination, a travel time corresponding to a time zone including an expected arrival point of time at a termination node of (n−1)th route constituting link, being connected to the (n) th route constituting link, or a travel time obtained from a moving speed corresponding to the time zone.

13. A navigation device according to claim 12, wherein: information for deciding whether the travel time or the moving speed of said respective links, is generated from actual measurement data or is generated from an interpolation processing on the actual measurement data, and a means which differentiates a display mode between the case where the travel time or the moving speed of each of said links is generated from actual measurement data and the case where the travel time or the moving speed of each of said links is generated from the interpolation processing on the actual measurement data, when information regarding the travel time or the moving speed of each of said links is displayed based on said statistical data.

14. A navigation device according to claim 12, comprising:

a means which obtains present status traffic information of each of said links present in the periphery of a current position detected by said current position detecting function, a means which receives a selection of a display mode, either of a mode for displaying information based on said statistical data and a mode for displaying information based on said present status traffic information, and a means which displays in the display mode thus selected.

* * * * *